US 12,099,657 B2

(12) United States Patent
Lee et al.

(10) Patent No.: US 12,099,657 B2
(45) Date of Patent: Sep. 24, 2024

(54) ELECTRONIC DEVICE FOR PERFORMING VARIOUS FUNCTIONS IN AUGMENTED REALITY ENVIRONMENT, AND OPERATION METHOD FOR SAME

(71) Applicant: Samsung Electronics Co., Ltd., Suwon-si (KR)

(72) Inventors: Miyoung Lee, Suwon-si (KR); Jooyoon Bae, Suwon-si (KR); Youngchan Woo, Suwon-si (KR); Gulji Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 17/427,608

(22) PCT Filed: Jan. 31, 2020

(86) PCT No.: PCT/KR2020/001514
§ 371 (c)(1),
(2) Date: Jul. 30, 2021

(87) PCT Pub. No.: WO2020/159302
PCT Pub. Date: Aug. 6, 2020

(65) Prior Publication Data
US 2022/0100279 A1    Mar. 31, 2022

(30) Foreign Application Priority Data
Jan. 31, 2019    (KR) .................. 10-2019-0012456

(51) Int. Cl.
*G06F 3/01*   (2006.01)
*G02B 27/01*  (2006.01)
(Continued)

(52) U.S. Cl.
CPC ......... *G06F 3/017* (2013.01); *G02B 27/0101* (2013.01); *G02B 27/017* (2013.01);
(Continued)

(58) Field of Classification Search
CPC ........ G06F 3/017; G06F 3/011; G06F 1/1686; G06F 1/1694; G06F 1/3215;
(Continued)

(56) References Cited

U.S. PATENT DOCUMENTS 10,089,328 B2   10/2018   Koike
10,656,721 B2    5/2020   Song et al.
(Continued)

FOREIGN PATENT DOCUMENTS

JP    2018-517967 A    7/2018
KR   10-2011-0084748 A   7/2011
(Continued)

OTHER PUBLICATIONS

International Search Report dated May 20, 2020 in connection with International Patent Application No. PCT/KR2020/001514, 2 pages.
(Continued)

*Primary Examiner* — Adam R. Giesy

(57) ABSTRACT

An electronic device according to various embodiments includes a display, a camera module, and at least one processor, wherein the at least one processor may be set to: display one or more real objects and one or more virtual objects through the display; receive a first input for selecting any one object from among the objects, and then receive a second input related to the picked object; analyze information about grouped objects when a third input is received for grouping the objects selected by repeating the first input and the second input; and provide a function extracted on the
(Continued)

basis of analyzing the information about the grouped objects, when a fourth input related to the grouped objects is received.

20 Claims, 35 Drawing Sheets

(51) Int. Cl.
  *G06T 19/00* (2011.01)
  *G06T 19/20* (2011.01)
  *G06V 20/20* (2022.01)
  *G06V 40/10* (2022.01)
  *G06V 40/20* (2022.01)

(52) U.S. Cl.
  CPC ............ *G06F 3/011* (2013.01); *G06T 19/006* (2013.01); *G06T 19/20* (2013.01); *G06V 20/20* (2022.01); *G06V 40/10* (2022.01); *G06V 40/28* (2022.01); *G02B 2027/0138* (2013.01); *G02B 2027/0178* (2013.01)

(58) Field of Classification Search
  CPC .... G06F 1/3231; G06F 1/3278; G06F 1/3287; G06F 3/0304; G06F 3/04815; G06F 3/0482; G06F 3/04842; G06F 3/04847; G06F 1/163; G06F 3/005; G06F 3/0488; G02B 27/0101; G02B 27/017; G02B 2027/0138; G02B 2027/0178; G06T 19/006; G06T 19/20; G06V 20/20; G06V 40/10; G06V 40/28; Y02D 10/00
  See application file for complete search history.

(56) References Cited

U.S. PATENT DOCUMENTS

| | | |
|---|---|---|
| 2009/0307623 A1 | 12/2009 | Agarawala et al. |
| 2012/0089947 A1 | 4/2012 | Lee et al. |
| 2013/0283214 A1 | 10/2013 | Kim et al. |
| 2014/0237366 A1* | 8/2014 | Poulos .................... G06F 3/013 715/728 |
| 2016/0232708 A1 | 8/2016 | Kim et al. |
| 2017/0060230 A1 | 3/2017 | Faaborg et al. |
| 2017/0199580 A1 | 7/2017 | Hilliges et al. |
| 2017/0220247 A1 | 8/2017 | Ban |
| 2017/0235372 A1 | 8/2017 | Song et al. |
| 2017/0308272 A1 | 10/2017 | Levien et al. |
| 2017/0352083 A1* | 12/2017 | Ruck ..................... G06F 3/0482 |
| 2018/0004283 A1 | 1/2018 | Mathey-Owens et al. |

FOREIGN PATENT DOCUMENTS

| | | |
|---|---|---|
| KR | 10-2013-0117553 A | 10/2013 |
| KR | 10-1712350 B1 | 2/2017 |
| KR | 10-2017-0096420 A | 8/2017 |
| KR | 10-1766592 B1 | 8/2017 |
| KR | 10-2018-0064748 A | 6/2018 |
| KR | 10-1892735 B1 | 8/2018 |
| WO | 2019/017513 A1 | 1/2019 |

OTHER PUBLICATIONS

Written Opinion of the International Searching Authority dated May 20, 2020 in connection with International Patent Application No. PCT/KR2020/001514, 4 pages.

European Patent Office, "Supplementary European Search Report" dated Feb. 16, 2022, in connection with European Patent Application No. 20749662.1, 8 pages.

Communication pursuant to Article 94(3) EPC dated Jul. 24, 2023, in connection with European Patent Application No. EP20749662.1, 9 pages.

Office Action issued Feb. 20, 2024, in connection with Korean Patent Application No. 10-2019-0012456, 14 pages.

* cited by examiner

ELECTRONIC DEVICE FOR PERFORMING VARIOUS FUNCTIONS IN AUGMENTED REALITY ENVIRONMENT, AND OPERATION METHOD FOR SAME

CROSS-REFERENCE TO RELATED APPLICATIONS

This application is a 371 of International Application No. PCT/KR2020/001514 filed on Jan. 31, 2020, which claims priority to Korean Patent Application No. 10-2019-0012456 filed on Jan. 31, 2019, the disclosures of which are herein incorporated by reference in their entirety.

BACKGROUND

1. Field

Various embodiments of the present disclosure relate to an electronic device for interacting with a plurality of objects and performing various works related to the plurality of objects in an augmented reality environment, and an operation method thereof.

2. Description of Related Art

With the recent advance of digital technologies, various types of electronic devices are being widely used such as mobile communication terminals, smart phones, tablet personal computers (PCs), notebooks, personal digital assistants (PDA), wearable devices, digital cameras, personal computers (PCs) or the like.

In recent years, researches and developments for not only a call function, a multimedia play function (e.g., music play and video play), electronic payment and financial transaction but also an augmented reality (AR) function in an electronic device, and a use thereof, are being increased. Augmented reality can be a technology for synthesizing virtual related information (e.g., a text, an image, etc.) to a real thing (e.g., a real environment) and showing. Unlike virtual reality (VR) aiming at only a virtual space and thing, augmented reality can provide a virtual related object on an object called a real environment, and provide a user with additional information difficult to be acquired by the real environment only.

However, an augmented reality function provided in a conventional electronic device cannot provide a wide user experience because following an interactive scheme in a 2-dimensional (2D) environment in interacting with a real object and virtual object provided in augmented reality. For example, as a complex selection menu has to be used in selecting a plurality of objects and performing a function related to them, the complexity of a 3-dimensional (3D) environment is increased and thus many handling procedures may be needed for object selection and function selection. Accordingly, a user's need for decreasing the complexity and requiring intuitiveness at object and function use under the augmented reality environment is increasing.

Various embodiments disclose an interacting method and apparatus for picking an object more intuitively and simply in augmented reality.

Various embodiments disclose an interacting method and apparatus for picking a plurality of objects more intuitively and simply in augmented reality.

Various embodiments disclose a method and apparatus for picking a plurality of objects more intuitively and simply and performing a function related to them in augmented reality.

Various embodiments disclose a method and apparatus for picking a plurality of objects more intuitively and simply and offering information related to them in augmented reality.

Technological solutions the present document seeks to achieve are not limited to the above-mentioned technological solutions, and other technological solutions not mentioned above would be able to be clearly understood by a person having ordinary skill in the art from the following statement.

SUMMARY

An electronic device of various embodiments can include a display, a camera module and at least one processor. The at least one processor can be configured to display one or more real objects and one or more virtual objects through the display, and receive a first input for picking any one object from among the objects, and then receive a second input related to the picked object, and in response to a third input being received for grouping the objects picked by repeating the first input and the second input, analyze information about the grouped objects, and in response to a fourth input related to the grouped objects being received, offer a function extracted on the basis of analyzing the information about the grouped objects.

An operating method of an electronic device of various embodiments can include displaying one or more real objects and one or more virtual objects through a display of the electronic device, and receiving a first input for picking any one object from among the objects, and then receiving a second input related to the picked object, and in response to a third input being received for grouping the objects picked by repeating the first input and the second input, analyzing information about the grouped objects, and in response to a fourth input related to the grouped objects being received, offering a function extracted on the basis of analyzing the information about the grouped objects.

An electronic device of various embodiments and a method for the same can adjust a posture of the electronic device on the basis of a user input received in a state of displaying a preview image of a first image acquired through a first camera, thereby acquiring a second image having a second composition corresponding to a first composition of the first image through a second camera having a characteristic different from a characteristic of the first camera.

An effect obtainable from the present disclosure is not limited to the above-mentioned effects, and other effects not mentioned would be able to be apparently understood from the following statement by a person having ordinary skill in the art to which the disclosure pertains.

DETAILED DESCRIPTION

Various embodiments of the present document are mentioned below with reference to the accompanying drawings.

Figure 1:
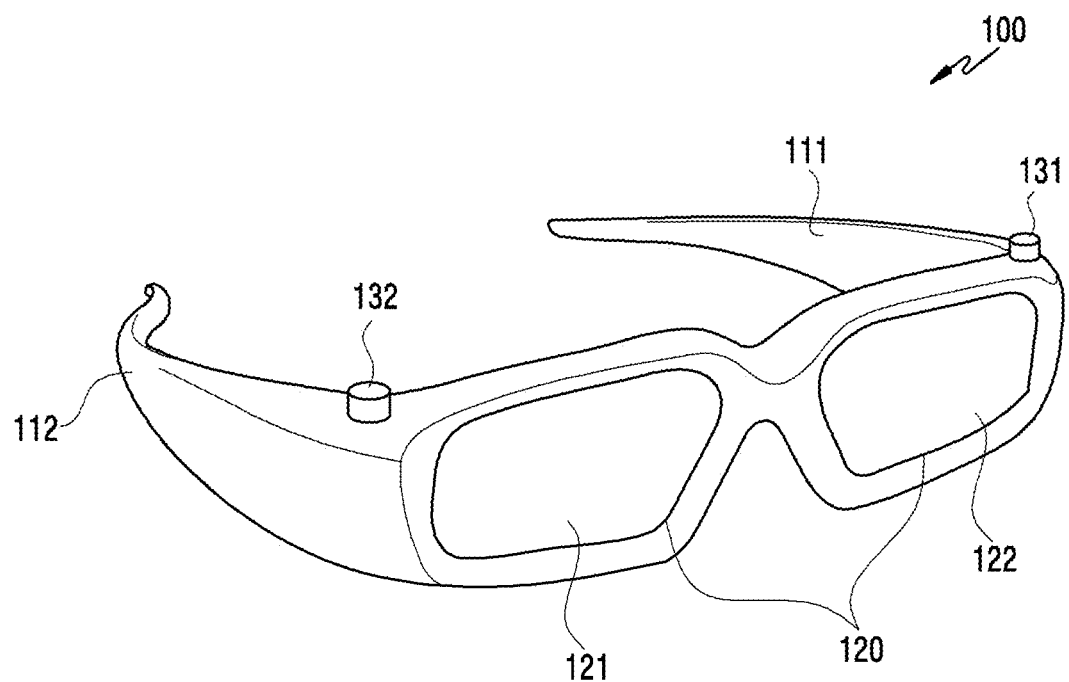
FIG. 1 is a perspective view of an electronic device performing various functions in an augmented reality environment according to various embodiments.

FIG. 1 is a perspective view of an electronic device 100 performing various functions in an augmented reality environment according to various embodiments.

Referring to FIG. 1, the electronic device 100 can be an eyeglass form which includes a frame 110 supporting at least one or more displays and/or lenses 120 (referred below to as displays) and disposed ahead of user's eyes, and temples 111 and 112 connected to both sides of the frame 110 and hanged on user's ears. For example, the temples 111 and 112 connected to the both sides of the frame 110 of the electronic device 100 can be implemented as a mount portion (e.g., a band) capable of fixing the frame to a user's head. According to an embodiment, the electronic device 100 can include one or more sensor modules 131 and 132 disposed in at least one or more of the temples 111 and 112 and/or the frame 110. In accordance with various embodiments, the display 120 can be implemented as one or more display and/or lens 121 and 122 portions, and perform a display and/or lens function according to an operation mode. According to some embodiment, the displays and/or lenses 121 and 122 can be integrated into one device performing various functions or be implemented as two or more separable devices.

According to an embodiment, the electronic device 100 can offer at least one of a see-through function for offering augmented reality (AR) or a see-closed function for offering virtual reality (VR). The see-through function, for example, can be defined as a function of forwarding a real external thing(s) to user's eyes through the display 120 while offering the real external thing or a virtual object or thing to a user by using visual or various sensible means. The see-through function can offer additional information about a really seen thing, etc., and/or images to the user. In another embodiment, the wearable electronic device 100 can offer additional information related to the see-through function to the user by using a hologram, etc. without the display 120 as well.

The see-closed function can offer two screens formed by the display 120 ahead of user's eyes respectively, thereby allowing a user to watch contents (e.g., a movie, streaming, broadcasting, a game, etc.) offered through the two screens. This see-closed function can offer immersion to the user by using an independent screen. According to some embodiment, the electronic device 100 can be designed in the form of mounting a display device replacing the display 120 as well. For example, the electronic device 100 can include one or two display devices which are disposed ahead of user's both eyes, respectively.

According to various embodiments, the wearable electronic device 100 can offer a see-through mode by using the display 120 or a camera (e.g., the sensor modules 131 and 132) installed in the frame 110. The see-through mode can display image data acquired from the cameras 131 and 132 through two screens formed by the display 120. Through this, a user can experience an external virtual environment and at the same time, confirm a peripheral environment through images of the camera 131 and 132 according to need.

According to various embodiments, the electronic device 100 can offer mixed reality (MR) (or hybrid reality). The mixed reality (MR) can include an environment in which virtual reality (VR) is combined to the real world and thus, a real physical object and a virtual object can interact with each other. The mixed reality (MR) can include a meaning of augmented reality (AR) of adding virtual information on the basis of reality and augmented virtuality (AV) of adding reality information to a virtual environment. The mixed reality can offer a smart environment of naturally connecting reality and virtuality, to allow a user to enjoy a wide experience. For example, the mixed reality can communicate with a virtual pet animal which is put on a user's palm, or build a virtual game environment within a real room to play a game. For another example, the mixed reality can build an environment of trying rearranging indoor furniture virtually, or being as if remote people gather and work together.

The above-described head-mounted wearable electronic device 100 can be called a head-mounted device (e.g., a head-mounted device (HMD) or a head-mounted theater (HMT)). According to some embodiment, the wearable electronic device 100 can be defined as an electronic device excluding the display 120 as well.

According to some embodiment, the wearable electronic device 100 can be designed to mount one or more components included in a display device such as a smart phone, on the frame 110. By this, an attachable and detachable display device and a structure related to this can be omitted.

According to various embodiments, a wearable electronic device designed to mount a display device replacing the display 120 can be wiredly or wirelessly connected with an external electronic device, and output contents received from the external electronic device through an output device such as the display, or transmit a user input provided from an input device, to the external electronic device.

Figure 2:
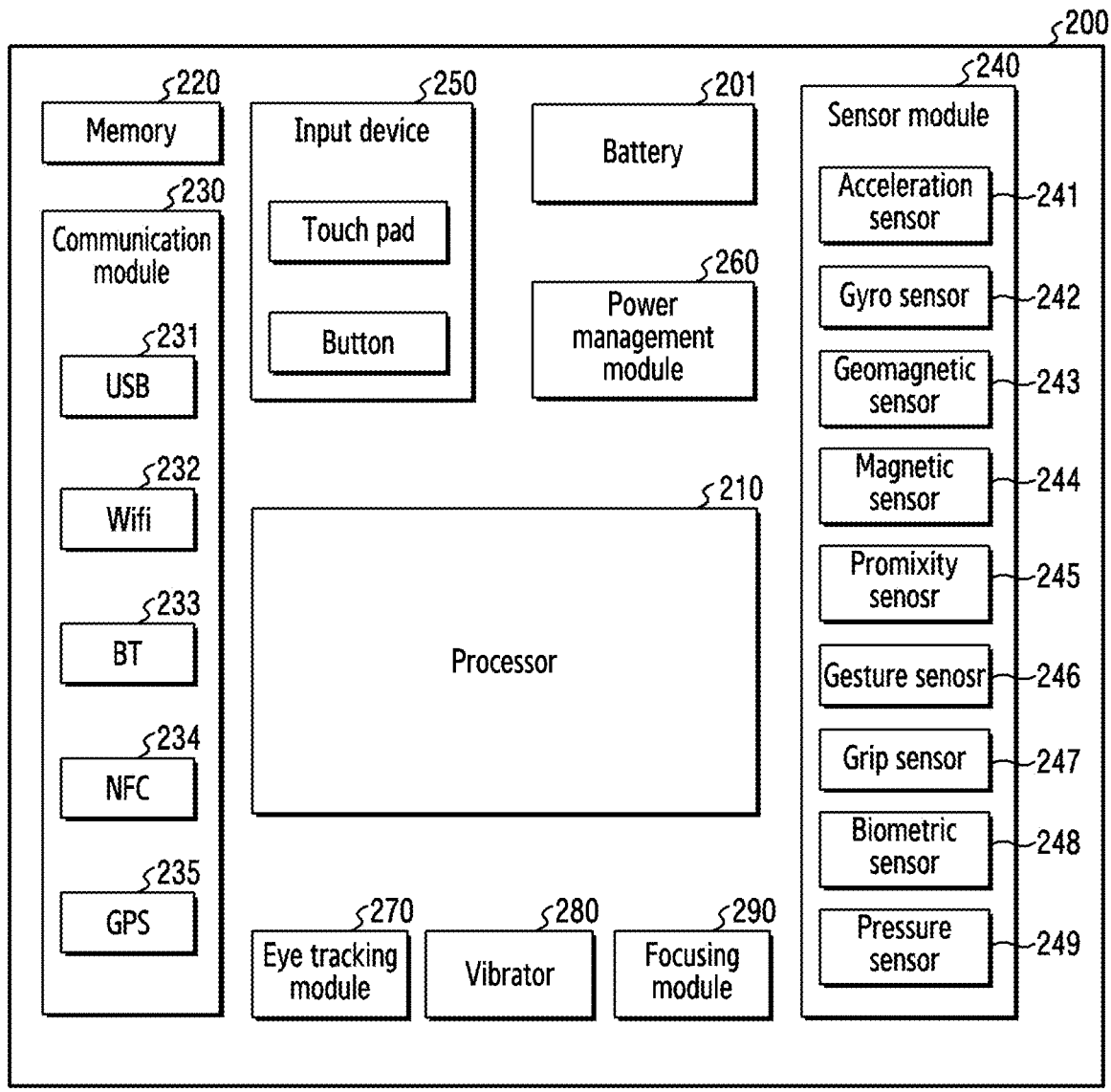
FIG. 2 is a block diagram of an electronic device performing various functions in an augmented reality environment according to various embodiments.

FIG. 2 is a block diagram of a head-mounted electronic device according to various embodiments.

Referring to FIG. 2, the head-mounted device 200 (e.g., 100 of FIG. 1) of various embodiments can include a processor 210, a memory 220, a communication module 230, a sensor module 240, an input device 250, a power management module 260, an eye tracking module (i.e., an eye tracker) 270, a vibrator 280, a focusing module (i.e., an adjustable optics) 290 (or a lens assembly) or a battery 201. In the block diagram of FIG. 2, other components (e.g., a display) are not illustrated for description convenience's sake. In another embodiment, some of the components illustrated in the block diagram can be included in a frame (e.g., 110 of FIG. 1) or be included in a display (e.g., 120 of FIG. 1).

The processor 210, for example, can include a micro controller unit (MCU), and drive an operating system (OS) or an embedded software program, to control many hardware components connected to the processor 210.

The memory 220 can store various data which are used by at least one component (e.g., the processor 210 or the sensor module 240) of the head-mounted device 200. The data, for example, can include input data or output data about software (e.g., program and a command related to this). The memory 220 can include a volatile memory or a non-volatile memory.

The communication module 230 can electrically connect a frame (e.g., 110 of FIG. 1) and a display (e.g., 120 of FIG. 1) by using wired communication and/or wireless communication, to perform data transmission and/or reception. According to an embodiment, the communication module 230 can include a universal serial bus (USB) module 231, a wireless fidelity (WiFi) module 232, a Bluetooth (BT) module 233, a near field communication (NFC) module 234 or a global positioning system (GPS) module 235, etc. According to various embodiments, at least some of the WiFi module 232, the BT module 233, the GPS module 235 or the NFC module 234 can be included in one integrated chip (IC) or IC package.

The sensor module 240 can meter a physical quantity and detect an activation state of the head-mounted device 200, and convert metered or detected information into an electric signal. The sensor module 240, for example, can include at least one of an acceleration sensor 241, a gyro sensor 242, a geomagnetic sensor 243, a magnetic sensor 244, a proximity sensor 245, a gesture sensor 246, a grip sensor 247, a biometric sensor 248, or a pressure sensor 249. According to an embodiment, at least one sensor (e.g., the proximity sensor 245, the grip sensor 247 or the pressure sensor 249, etc.) of the sensor module 240 can be used to detect the wearing or non-wearing of the head-mounted device 200. According to an embodiment, at least one sensor (e.g., the acceleration sensor 241, the gyro sensor 242 or the geomagnetic sensor 243) of the sensor module 240 can be used to detect the movement of a head on which the head-mounted device 200 is worn. In some embodiment, at least some of the sensor module 240 can be included in a display device such as a smart phone which is attachable to and detachable from the head-mounted device 200.

According to some embodiment, at least one of infrared ray (IR) recognition, pressurization recognition and/or a variation of capacitance (or permittivity) which are associated with user's wearing can be detected to detect the wearing or non-wearing of a user. The gesture sensor 246 can detect a gesture of a user's hand or finger, as an input motion for the head-mounted device 200. According to some embodiment, the sensor module 240 can recognize user's biometric information by using a biometric sensor (or a biometric recognition sensor) 248 such as an e-nose sensor, an electromyography sensor (EMG sensor), an electromyography sensor (EEG sensor), an electrocardiogram sensor (ECG sensor), an iris sensor, etc. According to various embodiments, the sensor module 240 can further include at least one control circuit for controlling at least one sensor belonging therein.

According to an embodiment, the pressure sensor 249 can be offered in the plural mutually different and, for example, can include a plurality of pressure sensors. In response to the head-mounted device 200 being mounted on a head, the plurality of pressure sensors are pressurized by a face. Accordingly to this, the processor 210 can acquire pressure values through the plurality of pressure sensors, and determine an arrangement state of the head-mounted device 200 related with the head on the basis of the detected pressure values, and control other components (e.g., the power management module 260) on the basis of this.

The input device 250 can include a touch pad or a button. The touch pad, for example, can recognize a touch input in at least one scheme among a capacitive overlay scheme, a pressure sensitive scheme, an infrared beam scheme, or an ultrasonic scheme. According to various embodiments, the touch pad can further include a control circuit as well. The capacitive touch pad is possible for physical contact or proximal recognition. The touch pad can further include a tactile layer as well, and can offer a tactile response to a user. The button, for example, can include a physical button, an optical key or a keypad, etc.

The eye tracking module 270, for example, can track user's eyes by using at least one scheme among an electrooculography (EOG) sensor, a coil system, a dual Purkinje system, bright pupil systems or dark pupil systems. According to various embodiments, the eye tracking module 270 can further include a micro camera for eye tracking as well.

The vibrator 280 may include at least one vibrator that is disposed in the head-mounted device 200. The vibrator 280 may activate a vibrator in various patterns on the basis of various types of triggers generated from the head-mounted device 200 in accordance with the control of the processor 210.

The focusing module 290 can measure a distance between user's both eyes (i.e., an inter-pupil distance (IPD)) and adjust a distance of a lens and a display position of a display device (e.g., 120 of FIG. 1), wherein a user can enjoy a movie suitable to its own eyesight.

The power management module 260 can manage power supplied to the head-mounted device 200. According to an embodiment, the power management module 260, for example, can be implemented as at least a portion of a power management integrated circuit (PMIC).

The battery 201 can supply power to at least one component of the head-mounted device 200. According to an embodiment, the battery 290 can include, for example, a primary cell which is not rechargeable, a secondary cell which is rechargeable, or a fuel cell.

Figure 3:
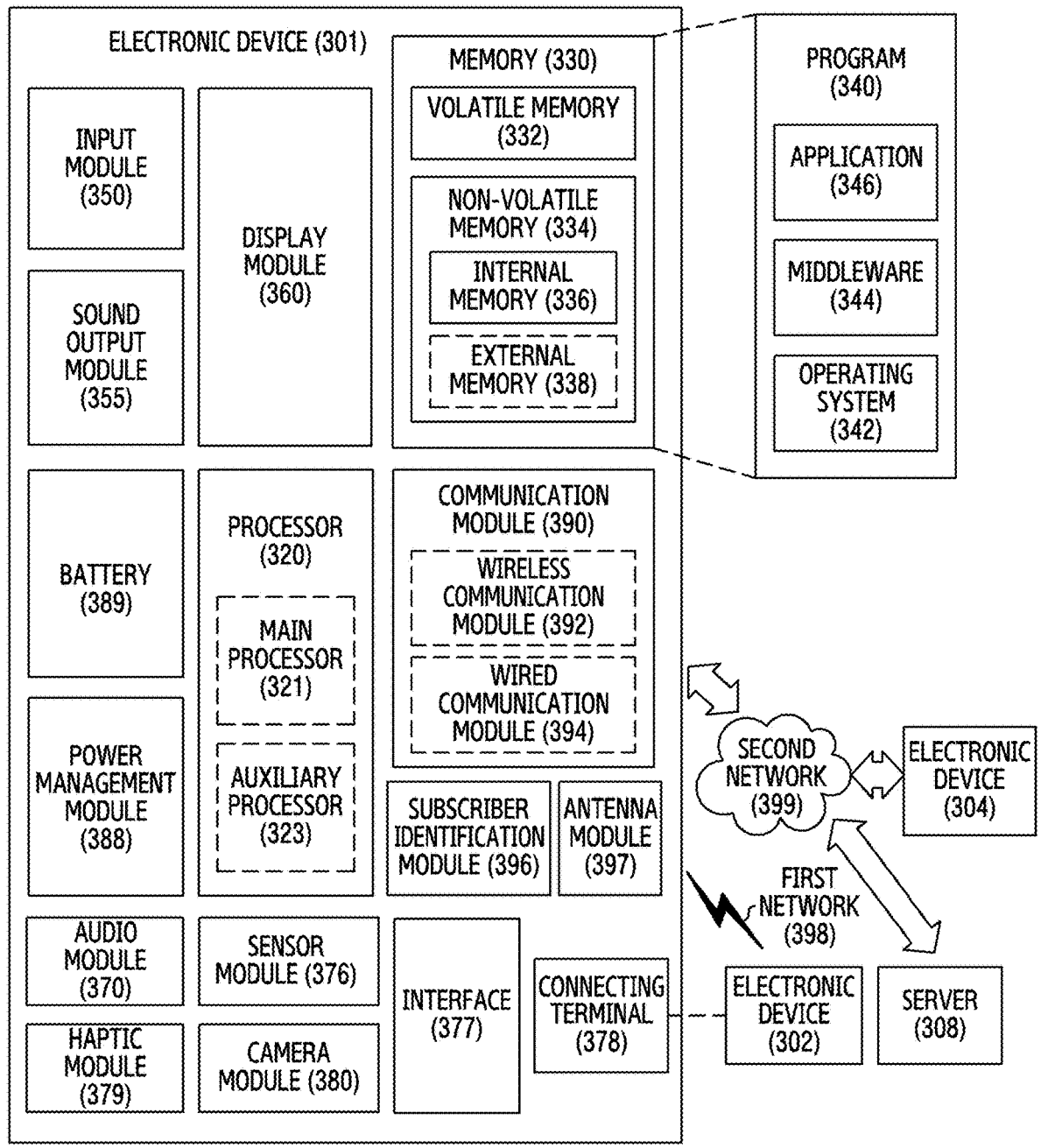
FIG. 3 is a block diagram of an electronic device within a network environment, performing various functions in an augmented reality environment according to various embodiments.

FIG. 3 is a block diagram of an electronic device within a network environment, performing various functions in an augmented reality environment according to various embodiments. The electronic device 301 can be the display 120 of FIG. 1 or 2. According to various embodiments, the electronic device 301 can be the head-mounted device 100 or 200 of FIG. 1 or 2.

FIG. 3 is a block diagram illustrating an electronic device 301 in a network environment 300 according to various embodiments. Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, a keyboard, or a digital pen (e.g., a stylus pen).

The sound output device 355 may output sound signals to the outside of the electronic device 301. The sound output device 355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to an embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to an embodiment, the audio module 370 may obtain the sound via the input device 350, or output the sound via the sound output device 355 or a headphone of an external electronic device (e.g., an electronic device 302) directly (e.g., wiredly) or wirelessly coupled with the electronic device 301. The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB). According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

According to various embodiments, an electronic device (e.g., the electronic device 100 of FIG. 1, the electronic device 200 of FIG. 2 or the electronic device 301 of FIG. 3) can include a display (e.g., the display 120 of FIG. 1 or the display device 360 of FIG. 3), a camera module (e.g., the cameras 131 and 132 of FIG. 1 or the camera module 380 of FIG. 3) and at least one processor (e.g., the processor 210 of FIG. 2 or the processor 320 of FIG. 3).

The at least one processor 210 or 320 can be configured to display one or more real objects and one or more virtual objects through the display 120 or 360, and receive a first input for picking any one object from among the objects, and then receive a second input related to the picked object, and in response to a third input being received for grouping the objects picked by repeating the first input and the second input, analyze information about the grouped objects, and in response to a fourth input related to the grouped objects being received, offer a function extracted on the basis of analyzing the information about the grouped objects.

According to various embodiments, the second input can be received in a state in which the first input is maintained.

According to various embodiments, the second input can be received corresponding to a series of input motions.

According to various embodiments, the second input can be received corresponding to motions which comprise a first motion of moving to a specific region in a state in which the first input is maintained and a second motion carried out for the any one object in the specific region.

According to various embodiments, at least one of the first to fourth inputs can be received through the camera module.

According to various embodiments, the first input can be received corresponding to a first motion of two or more fingers of one hand of a user.

According to various embodiments, the second input can be received corresponding to a motion of moving the one hand of the user to a region specified by a third motion of the other hand of the user, and a second motion of a finger of the one hand within the specific region.

According to various embodiments, the processor 210 or 320 can cancel the picking of a corresponding object correspondingly to the second motion of the finger of the one hand outside the specific region.

According to various embodiments, in response to a fifth input which corresponds to a fourth motion of the other hand being received before the reception of the fourth input, the processor 210 or 320 can cancel the picking of the grouped objects.

According to various embodiments, in response to an editing mode being inputted after the reception of the fourth input, the processor 210 or 320 can release the grouping and set wherein at least one of the grouped objects is pickable.

Figure 4:
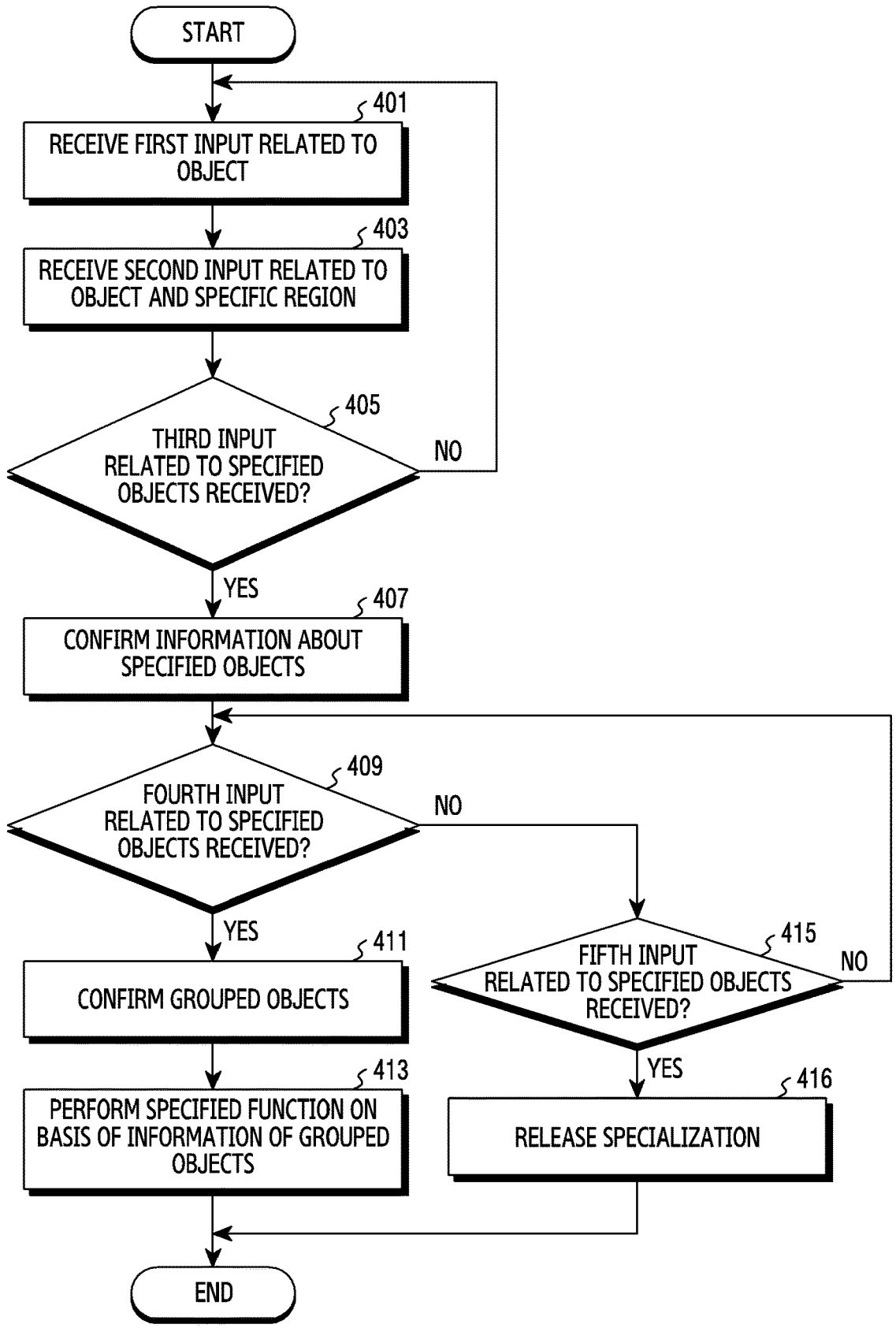
FIG. 4 is a flowchart for explaining an example of an operation of an electronic device according to various embodiments.

FIG. 4 is a flowchart for explaining an example of an operation of an electronic device according to various embodiments.

According to various embodiments, a processor (e.g., the processor 210 of FIG. 2 or the processor 320 of FIG. 3) of the electronic device (e.g., the electronic device 100 of FIG. 1, the electronic device 200 of FIG. 2 or the electronic device 301 of FIG. 3) can, in operation 401, receive a first input related to an object. The object, for example, can include a real object or a virtual object in an AR environment. The object can, regardless of its term, for example, include an app or an object embodying a function such as an icon displaying a function.

The first input, for example, can include a motion of such as making proximal the thumb and the index finger (or a plurality of fingers excepting the thumb) within a predetermined range of an object and picking the object. The first input, for example, can include a motion of drawing (checking) a line in the form of, for example, the V related to an object by using one or more fingers. The first input, for example, can include a motion of touching or tapping an object with a hand including fingers.

In operation 403, the processor 210 or 320 can receive a second input related to the object, which is a target of the first input received in operation 401, and a specific region. The second input, for example, can be an input associating the target object with the specific region. The second input, for example, can be comprised of a series of input motions which include an input of a motion of user's specifying a specific region, and a region of a motion associating the target object with the specific region. The specific region, for example, can be a region that a user specifies through a specified motion. The specific region, for example, can be a region which is set with a specified range to a specific position according to a user's voice command. The specific region, for example, can be visualized, and displayed, in a form such as a palm, a tray or a cart. The specific region, for example, can be provided instantly as a user executes a pickup mode by a voice, a motion or a menu in order to pick and group an object, or be provided as the user performs a motion of tapping, touching or checking the object under the pickup mode. The motion of associating the picked object and the specific region, for example, can maintain a motion of picking the object by using the thumb and the index finger (or the plurality of fingers excluding the thumb), and include a motion of moving to a specific region and putting down the picked object (e.g., a motion of spreading out fingers). The motion of associating the picked object and the specific region, for example, can include a motion of tapping, touching or checking the specific region subsequent to a motion of tapping, touching or checking the specific object. The motion of associating the picked object and the specific region, for example, can include a motion of tapping, touching or checking the object after providing the specific region.

Operations 401 and 403 can be repeatedly performed and accordingly to this, a plurality of objects can be picked and specified.

In operation 405, the processor 210 or 320 can receive a third input related to specified objects. In accordance with the third input, the processor 210 or 320 can group the specified objects. The third input, for example, can include a motion of grabbing a fist or cupping a palm. The third input, for example, can include a voice command of instructing grouping or completion. The third input, for example, can include a motion of tapping a specific region once or more (e.g., double tap) or a motion of touching and holding for a predetermined time or longer (e.g., long press). Until when the third input is received in operation 405, operations 401 and 403 can be repeatedly performed and a plurality of objects can be additionally picked and specified.

In operation 407, the processor 210 or 320 can confirm information about the specified objects. In response to the specified object being a virtual object, the processor 210 or 320 can confirm information about the virtual object. In response to being a real object, for example, the processor 210 or 320 can transmit an image of the real object to a server (e.g., the server 308 of FIG. 3) or an external electronic device (e.g., the electronic device 302 or 304 of FIG. 3) and receive information about the corresponding image. Operation 407 can be omitted or be integrated into operation 411 described later.

In operation 409, the processor 210 or 320 can receive a fourth input related to the specified objects. The fourth input, for example, can be a repetition of an inverse motion, or the same motion, of the third input. The fourth input, for example, can be a motion of unclenching a fist. The fourth input, for example, can include a motion of tapping a specific region at plural times (e.g., double tap) or a motion of touching and holding for a predetermined time or longer (e.g., long press) or uttering a confirming (i.e., viewing) command by a voice. The fourth input, for example, can include a motion such as a gesture of attaching an object such as a tray or cart representing a specific region to a specified region such as an edge of a bottom, wall or screen.

As receiving the fourth input, the processor 210 or 320 can, in operation 411, confirm information of the grouped objects. The processor 210 or 320 can display an image, and/or information, of the grouped objects. Also, the processor 210 or 320 can analyze the information of the grouped objects and extract common information or analogized information from the information of the grouped objects.

In operation 413, the processor 210 or 320 can allow the electronic device 100, 200 or 301 to perform a specified function on the basis of the information of the grouped objects.

The processor 210 or 320 can extract a list of functions corresponding to the common information or analogized information among the information of the grouped objects. In response to the corresponding function being plural, the processor 210 or 320 can present the corresponding functions, for example, in order of function executed most for the corresponding objects in the electronic device 100, 200 or 301 or in order of function executed generally most or in order of user setting. In response to one function being extracted, the processor 210 or 320 can perform the corresponding function instantly or according to user selection. In response to a plurality of functions being extracted, the processor 210 or 320 can display and present a list of the extracted functions in specified order for the sake of user selection, or recommend any one or more functions among the plurality of functions to allow the user to select.

An example of a function capable of being presented on the basis of the information of the grouped objects is given as follows.

For example, in response to the grouped objects being characters, a file share function such as a contact, a schedule or a photo taken together can be presented. For example, in response to a product or thing being grouped together with the character, when the product is an exercise tool, for example, an exercise method can be recommended and, when the product is clothes, shoes or a bag, a virtual fitting function can be recommended. For example, in response to a specific place being grouped together with the character, a function for setting a visit record to the specific place can be recommended. For example, in response to virtual objects such as an image, an app and a virtual thing being picked together with the character, a function of synthesizing the corresponding picked virtual object and the character, searching for an image of the corresponding character, executing a corresponding app function for the corresponding character, scheduling with a calendar and/or providing a synthesized image together with a virtual character can be recommended.

For example, in response to the product or thing being selected in the plural, a function of comparing the corresponding products or an electronic payment function can be recommended. For example, in response to virtual objects such as an image, an app and/or a button being grouped together with the product or thing, the product and the image or a movie can be synthesized to be utilized as an AR widget or a function offered by the button can be applied to the corresponding product to change an AR environment.

For example, in response to food being grouped together with food, a freezer, an oven and a place, a function for a cooking method, a safekeeping method, a visit place and a menu record can be recommended. For example, in response to a place and a place being grouped, a function for confirming a travel trajectory can be recommended. For example, in response to a plurality of devices being grouped, a function for controlling the devices can be recommended. For example, in response to the device being grouped together with a virtual object such as an image, an app and a button, a function of playing the corresponding image in the corresponding device, a control function such as device use reservation and time setting, a function of displaying the corresponding image as a virtual image in the corresponding device or various device control functions can be recommended.

For example, in response to an image being grouped together with other images, an app, a virtual object or buttons, a function of foldering, simultaneously playing several contents by a multi window, contents connecting, synthesizing or editing and a slide show function can be recommended. For example, in response to an app being grouped with a specific button, a function for changing a scale, location or color of a virtual object can be recommended. For example, in response to a place such as a room being grouped with a button, a function capable of controlling light or a temperature within the room can be recommended. For example, in response to a button and a button being grouped, an individualized multi-function control remote controller can be recommended.

On the other hand, in operation 415, in response to a fifth input related to the specified objects being received before a fourth input related to the specified objects is received, the processor 210 or 320 can release the specialization of the objects. The processor 210 or 320 can delete temporarily stored object information about picked objects. The fifth input, for example, can be a motion of turning the spread-out palm upside down. As the motion of turning the palm upside down is received, the processor 210 or 320 can display an image in which a palm, tray or cart shaped object turns upside down and objects being picked and safely kept in a specific region fall down.

Though not illustrated, even after specified objects are grouped as the fourth input related to the specified objects is received, a user can pick by, for example, touching and holding for a predetermined time or longer (long press) a voice command for editing or addition or at least some of displayed objects or a specific region, thereby allowing to enter an editing mode, and can allow to eliminate the picked at least some objects from a group, or pick and add other objects to the group.

Figure 5A:
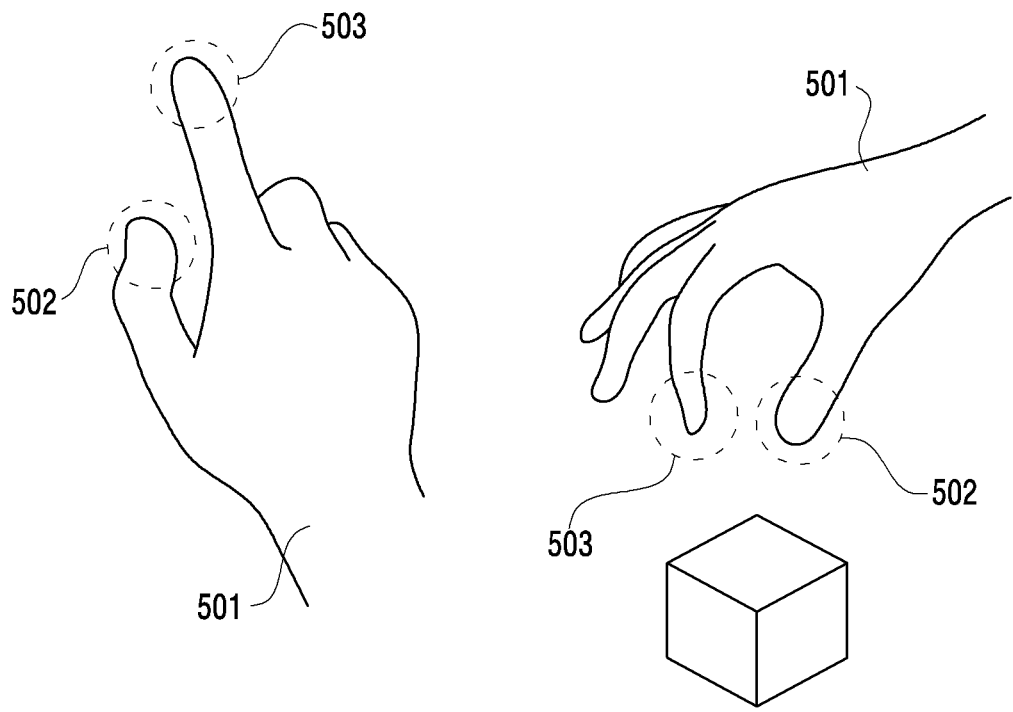
FIG. 5A to FIG. 5C are diagrams for explaining an example of an object pickup operation of an electronic device according to various embodiments.
Figure 5B:
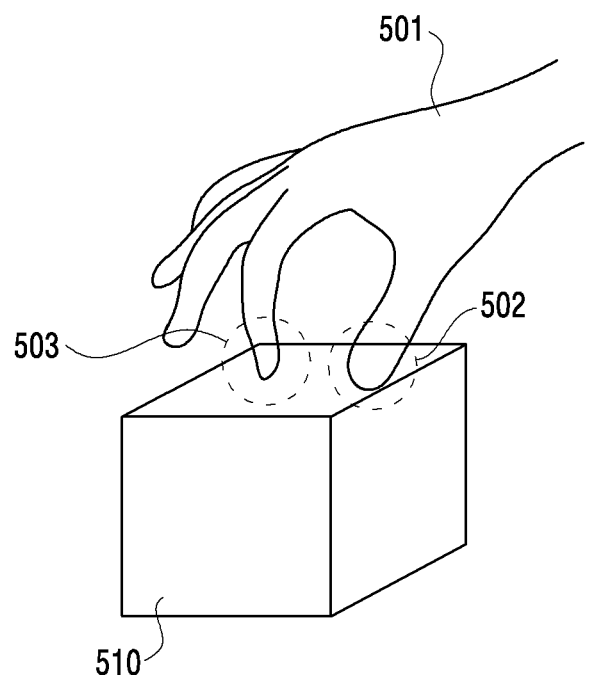
Figure 5C:
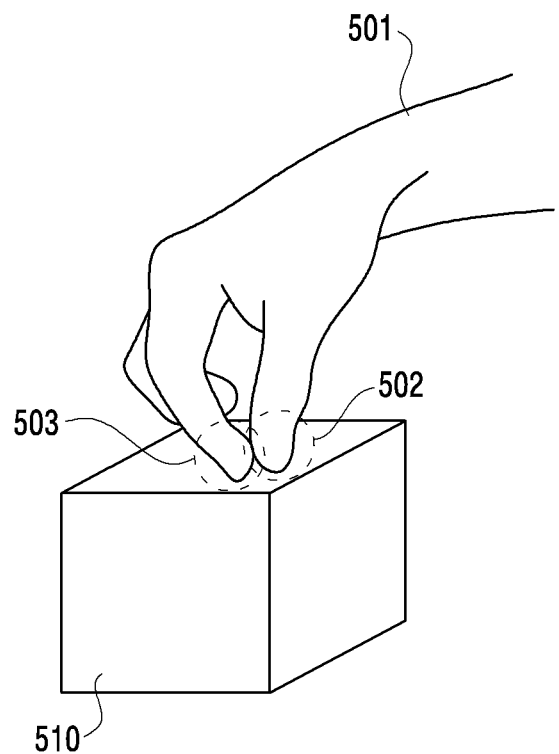

FIG. 5A to FIG. 5C are diagrams for explaining an example of an object pickup operation of an electronic device according to various embodiments.

Referring to FIG. 5A, a processor (e.g., the processor 210 of FIG. 2 or the processor 320 of FIG. 3) of the electronic device (e.g., the electronic device 100 of FIG. 1, the electronic device 200 of FIG. 2 or the electronic device 301 of FIG. 3), for example, can confirm a finger shape of a user's hand 501 and recognize a state of spreading out the thumb 502 and the index finger 503 as a waiting state for object picking, and can determine the user's thumb 502 and/or index finger 503 or an object located in a region of a predetermined range from these, as objects being in a pick position.

Referring to FIG. 5B, in response to the thumb 502 and index finger 503 of the user's hand 501 approaching within a predetermined distance range of an object 510 in a state in which they are spread out, the processor 210 or 320 can, for example, highlight the corresponding object 510 and wait for a pickup motion for picking the corresponding object 510.

Referring to FIG. 5C, in response to the thumb 502 and index finger 503 of the user's hand 501 getting close within a predetermined range or more, the processor 210 or 320 can determine that an input for picking the corresponding object 510 which is on pickup standby is received.

Figure 6:
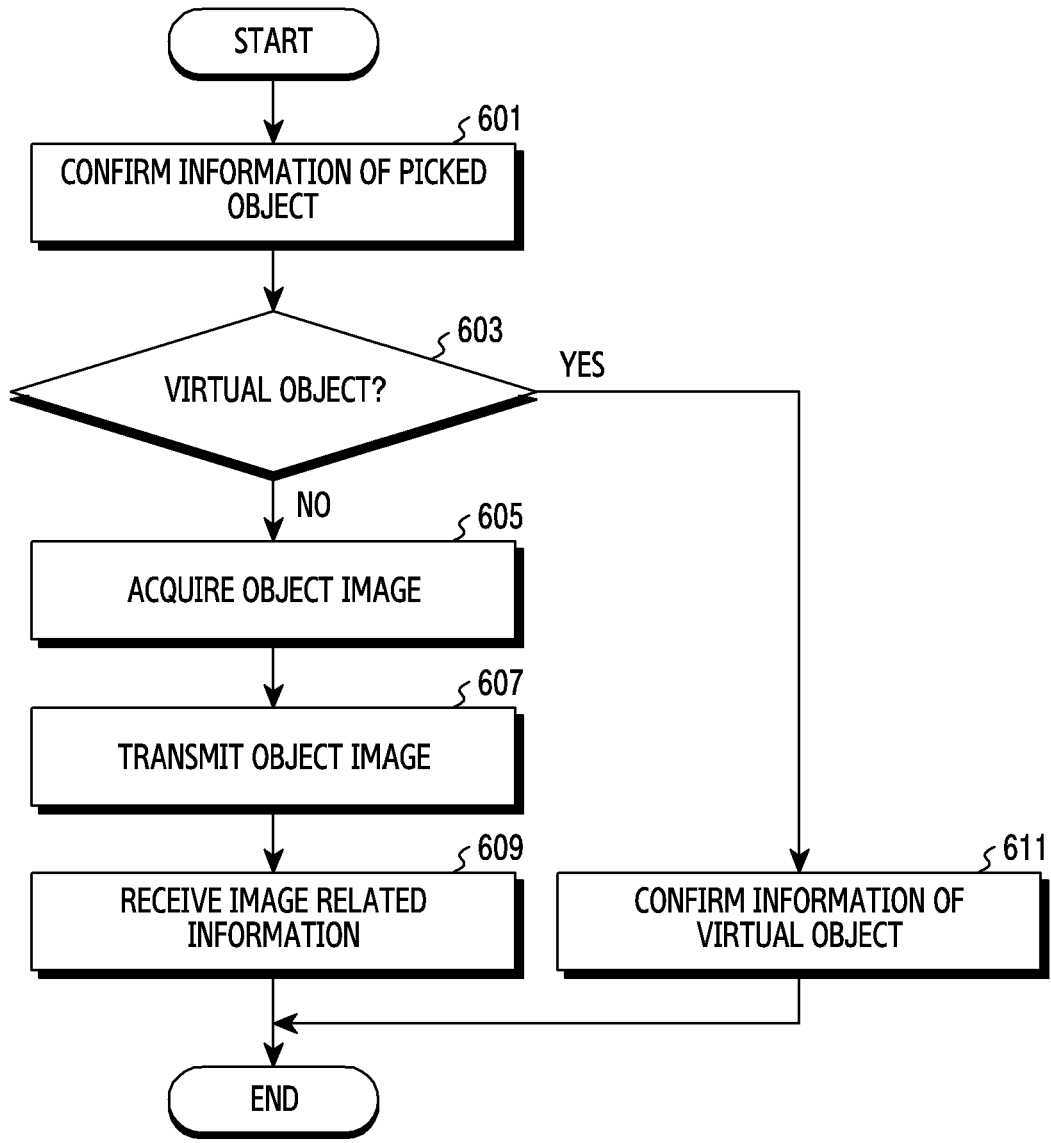
FIG. 6 is a flowchart for explaining an example of an object pickup operation of an electronic device according to various embodiments.

FIG. 6 is a flowchart for explaining an example of an object pickup operation of an electronic device according to various embodiments.

In operation 601, for example, in response to it being confirmed that a specific object is picked according as a first input is received in operation 401 of FIG. 4, a processor (e.g., the processor 210 of FIG. 2 or the processor 320 of FIG. 3) of the electronic device (e.g., the electronic device 100 of FIG. 1, the electronic device 200 of FIG. 2 or the electronic device 301 of FIG. 3) confirms information of the picked object. In case of a virtual object, object information can include image information for rendering a 3D virtual object, and attribute and text information including a name, type and characteristic of an object. In case of a real object, object information may not exist in the electronic device 100, 200 or 301.

In operation 603, the processor 210 or 320 can determine whether the picked object is a virtual object. In response to not being the virtual object, in operation 605, the processor 210 or 320 can acquire an object image of a real object. For this, the processor 210 or 320 can capture a region of a predetermined range from an image acquired by a camera (e.g., the camera 131 or 132 of FIG. 1 or the camera module 380 of FIG. 3), for example, from a position of a user's hand or finger. The processor 210 or 320 can calculate the position of the user's hand or finger in an image including objects acquired by the camera module 380, and capture a region of a predetermined range centering on the calculated position and acquire the same as an object image. The processor 210 or 320 can extract a characteristic of an object from the acquired object image and check whether the extracted characteristic is consistent with an object characteristic stored in a memory (e.g., the memory 220 of FIG. 2 or the memory 330 of FIG. 3).

On the other hand, in operation 607, the processor 210 or 320 can transmit the acquired object image, for example, to a server (e.g., the server 308 of FIG. 3) and, in operation 609, can receive related information about the transmitted image from the server 308. In response to the picked object being the virtual object, in operation 611, the processor 210 or 320 can confirm information of the virtual object from the memory 220 or 330.

As the second input is received in operation 403 of FIG. 4, the processor 210 or 320 can determine that an object holding motion is inputted, and list and separately temporarily store the received or confirmed object related information.

Figure 7A:
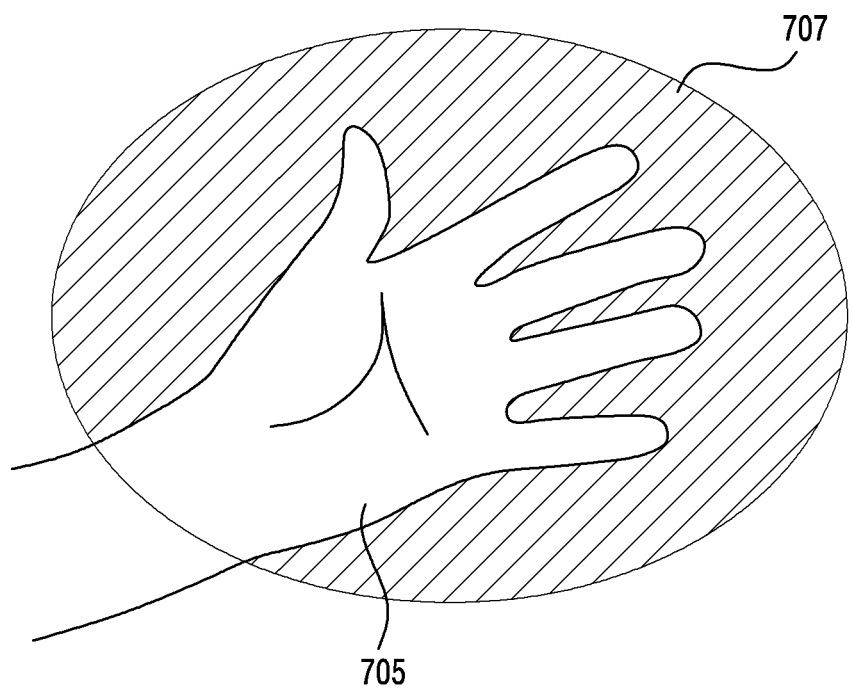
FIG. 7A to FIG. 7C are diagrams for explaining an example of an object holding operation of an electronic device according to various embodiments.
Figure 7B:
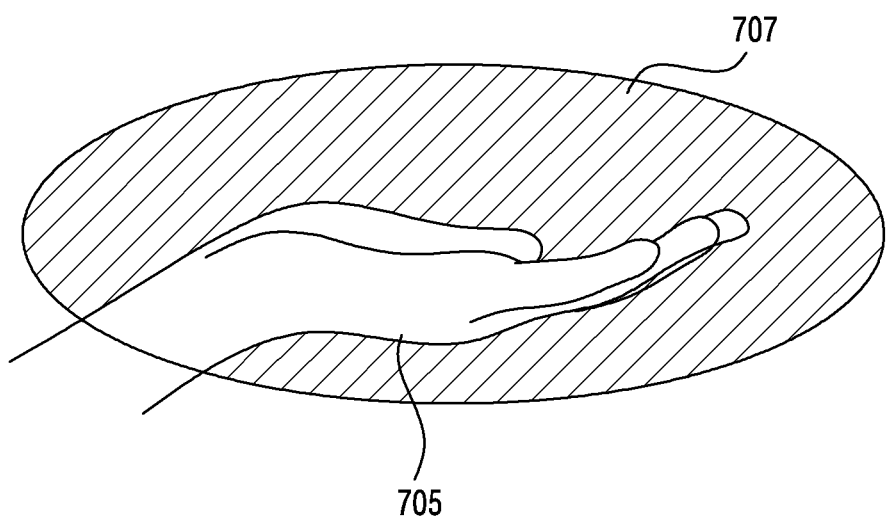
Figure 7C:
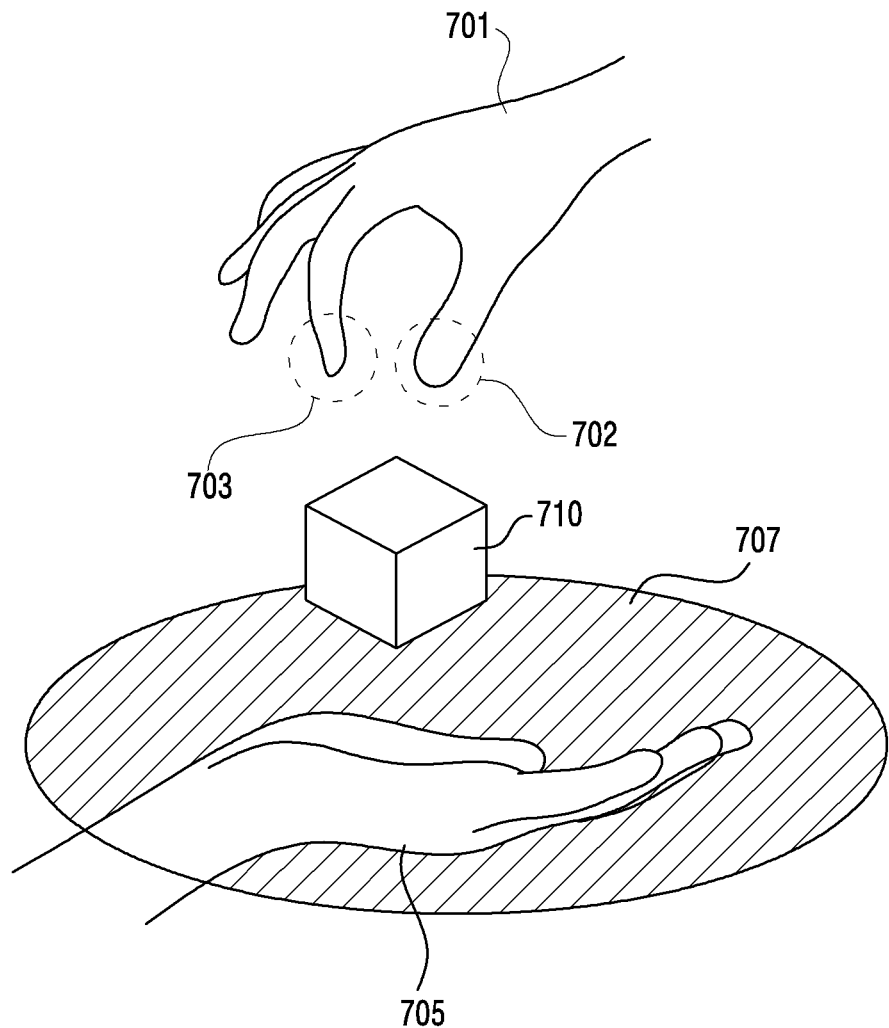

FIG. 7A to FIG. 7C are diagrams for explaining an example of an object holding operation of an electronic device according to various embodiments.

Referring to FIG. 7A, as a motion of spreading out a palm of a user's hand 705 is sensed, the processor 210 or 320 can set a region of a predetermined range from the user's hand 705 as a specific region 707. The processor 210 or 320 can vary the set specific region 707 in color or replace the set specific region 707 with a tray or cart shape and display. Referring to FIG. 7B, the set specific region 707 can be changed according to the direction of the user's hand 705. In accordance with an embodiment, it can be implemented that while a motion of the user's hand 705 is maintained, an object can be additionally picked. In accordance with an embodiment, it can be implemented that even in response to the user's hand 705 motion not being maintained exactly, the set region 707 can be fixed and maintained, while the user's other hand 701 is hovering so as to pick an object or until before an object grouping command or an object pick completion command is received by the user's hand 705 or by another input.

Referring to FIG. 7C, the user's hand 705 for setting the specific region 707 and the user's hand 701 for picking the object 710 can be hands different from each other. A user can spread out the thumb 702 and the index finger 703 within a range of the specific region 707 with respect to the object 710 that the user picks with the thumb 702 and index finger 703 of the other hand 701 and moves to and draws into the specific region 707, thereby associating the object 710 with the specific region 707. For example, the processor 210 or 320 can display an image in which the thumb 702 and index finger 703 of the user's hand 701 are spread out and the corresponding object 710 is held within the specific region 707, thereby showing that the corresponding object 710 is separately on standby for the sake of grouping within the specific region 707.

Figure 8:
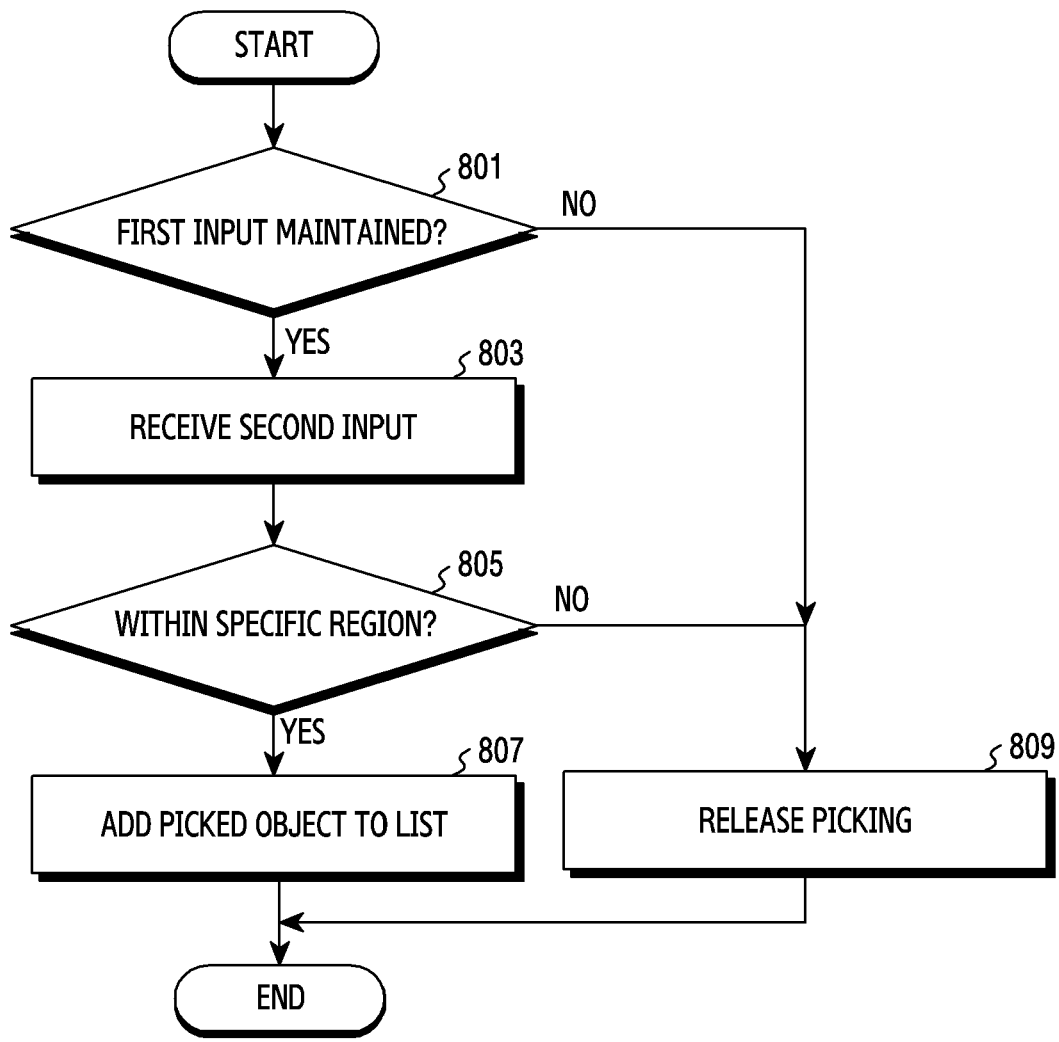
FIG. 8 is a flowchart for explaining an example of an object holding operation of an electronic device according to various embodiments.

FIG. 8 is a flowchart for explaining an example of an object holding operation of an electronic device according to various embodiments.

Referring to FIG. 8, a processor (e.g., the processor 210 of FIG. 2 or the processor 320 of FIG. 3) of the electronic device (e.g., the electronic device 100 of FIG. 1, the electronic device 200 of FIG. 2 or the electronic device 301 of FIG. 3), for example, can confirm that a specific object is picked according as a first input is received in operation 401 of FIG. 4. In operation 801, the processor 210 or 320 can check whether the first input is maintained. Then, in operation 803, the processor 210 or 320 can receive, for example, a second input of operation 403 of FIG. 4 in a state in which the first input is maintained. In operation 805, the processor 210 or 320 can check whether a position where the second input received after the maintaining of the first input is provided is within a specific region. In response to the position where the second input is provided being within the specific region, in operation 807, the processor 210 or 320 can add the picked object which is a grouping target, to a list. On the other hand, in response to the position where the second input is provided not being within the specific region, in operation 809, the processor 210 or 320 can release the picking of the corresponding object. Accordingly, the user can provide a second input outside the specific region with respect to the object picked according to the first input, thereby simply canceling the picking of the corresponding object.

Figure 9A:
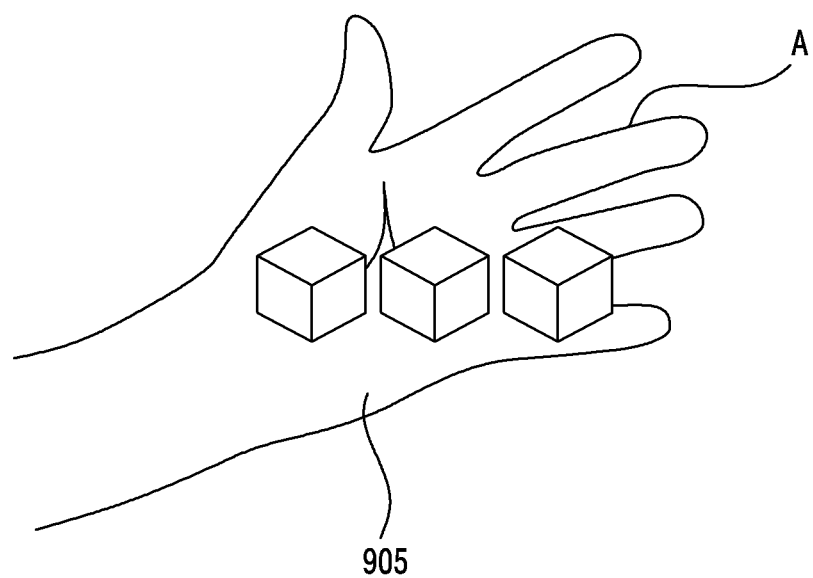
FIG. 9A to FIG. 9C are diagrams for explaining an example of an object grouping and confirming operation of an electronic device according to various embodiments.
Figure 9B:
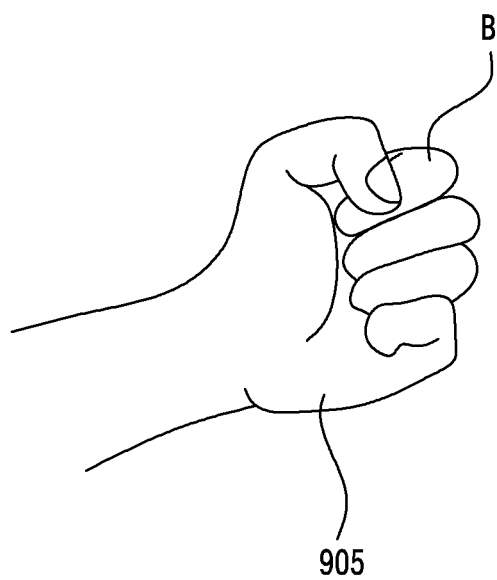
Figure 9C:
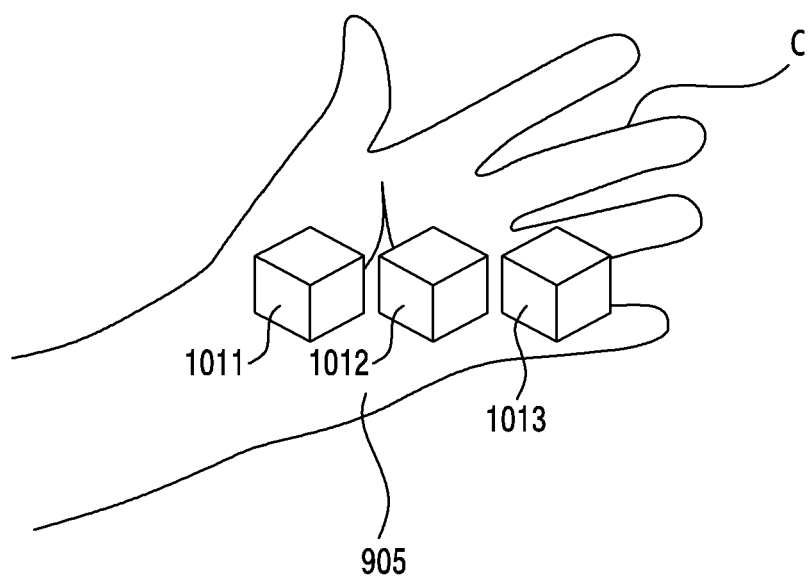

FIG. 9A to FIG. 9C are diagrams for explaining an example of an object grouping and confirming operation of an electronic device according to various embodiments.

Referring to FIG. 9A, for example, a user can maintain a motion (A) of spreading out a palm of a hand 905 recognized as a tray, thereby inputting a command of keeping possessing or holding picked objects in a specific region.

Referring to FIG. 9B, for example, the user can perform a motion (B) of changing the palm of the hand 905 recognized as the tray from the spread-out state (A) and cupping the palm or grabbing a fist, thereby performing possessing or holding in the specific region and inputting a grouping command for objects which are on grouping standby and accordingly to this, can complete the grouping of a plurality of objects.

Referring to FIG. 9C, for example, the user can change a state from the motion (B) of grabbing the fist of the hand 905 in FIG. 9B and perform a motion (C) of unclenching the fist of the hand 905 and spreading out the palm, thereby inputting a command of confirming (i.e., viewing) the grouped objects 1011, 1012 and 1013.

Figure 10A:
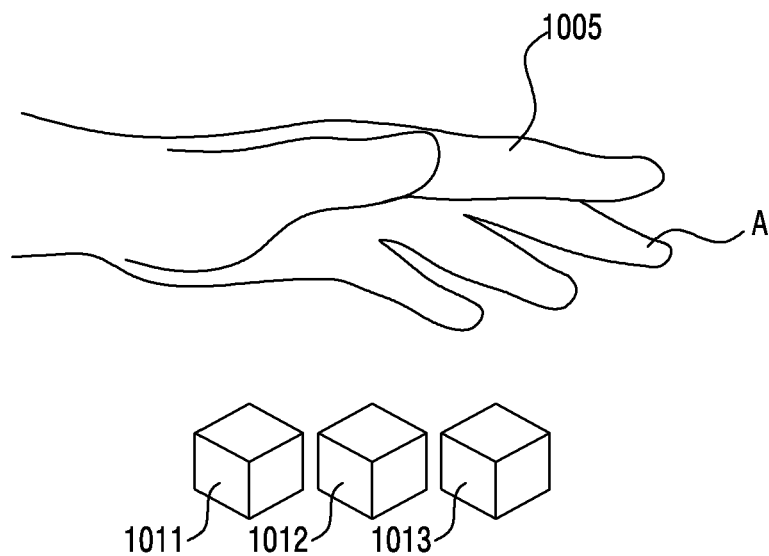
FIG. 10A to FIG. 10B are diagrams for explaining an example of an object pick canceling operation of an electronic device according to various embodiments.
Figure 10B:
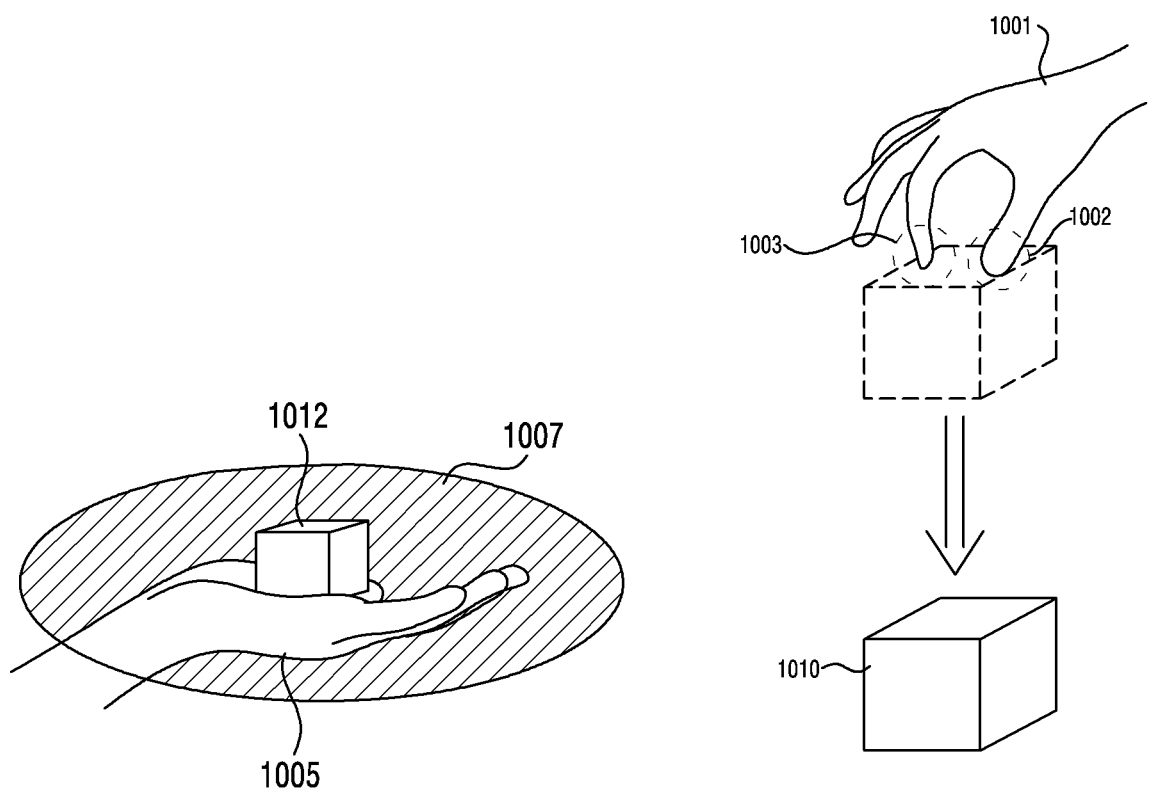

FIG. 10A and FIG. 10B are diagrams for explaining an example of an object pick canceling operation of an electronic device according to various embodiments.

Referring to FIG. 10A, for example, a user can perform a motion (A) of turning a palm surface upside down from a state of spreading out a palm of a hand 1005 recognized as a tray, thereby releasing all the picking of the picked object. On the other hand, for example, the user can maintain the motion (A) of turning the palm surface upside down for a predetermined time or longer in a state of a motion (e.g., a motion (C) of FIG. 9C) of spreading out the palm in order to input a command of confirming grouped objects in a state in which grouping is completed, thereby releasing the grouping and releasing all the picking of the picked object.

Referring to FIG. 10B, for example, the user can pick by performing a motion of being as if the user gets the thumb 1002 and index finger 1003 of the other hand 1001 approach closely and picks an object 1011 held in a tray region or a specific region 1007 in a state of spreading out the palm of the hand 1005 recognized as the tray, and move in this state and perform a motion of being as if the user spreads out the thumb 1002 and the index finger 1003 outside the specific region 1007 and drops the corresponding object 1011, thereby allowing to selectively cancel the picking of some of grouping-target objects which are picked and held.

Figure 11:
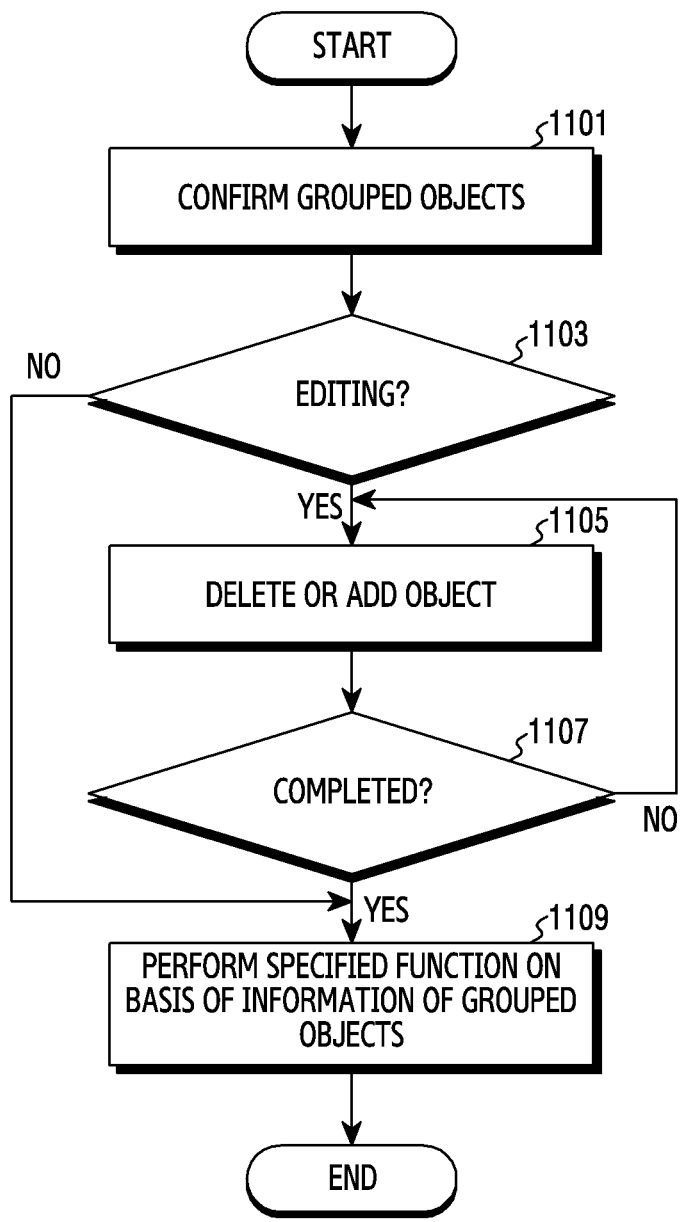
FIG. 11 is a flowchart for explaining an example of an object pick canceling or object pick adding operation of an electronic device according to various embodiments.

FIG. 11 is a flowchart for explaining an example of an object pick canceling or object pick adding operation of an electronic device according to various embodiments.

Referring to FIG. 11, a processor (e.g., the processor 210 of FIG. 2 or the processor 320 of FIG. 3) of the electronic device (e.g., the electronic device 100 of FIG. 1, the electronic device 200 of FIG. 2 or the electronic device 301 of FIG. 3) can, even after a grouping command is inputted and grouping is completed, execute an editing mode, to cancel the picking of a picked object or additionally pick an object.

For example, after the fourth input related to the specified objects is received according to operation 409 of FIG. 4 and the grouping of the objects is completed, a motion of confirming (i.e., viewing) information about the grouped objects can be performed in operation 411 of FIG. 4.

In operation 1101, the processor 210 or 320 can display the information about the grouped objects, to allow to confirm the grouped objects.

A user can confirm the information about the grouped objects, and input a voice command for editing or adding or touch and hold at least some of displayed (viewed) objects for a predetermined time or longer (long press) or touch and hold a tray region or specific region for a predetermined time or longer (long press), thereby entering an editing mode.

In response to it being determined that an editing mode execution command is inputted in operation 1103, the processor 210 or 320 proceeds to the editing mode and deletes a specific object from a grouping list or adds to the grouping list according to a user's input.

In operation 1107, the processor 210 or 320 can determine whether an editing mode ending or grouping command is received and complete the grouping.

In response to the grouping being completed, the processor 210 or 320 can, in operation 1109, perform a specified function on the basis of grouped object information. The processor 210 or 320 can present a recommended function, to allow a user to pick.

Figure 12:
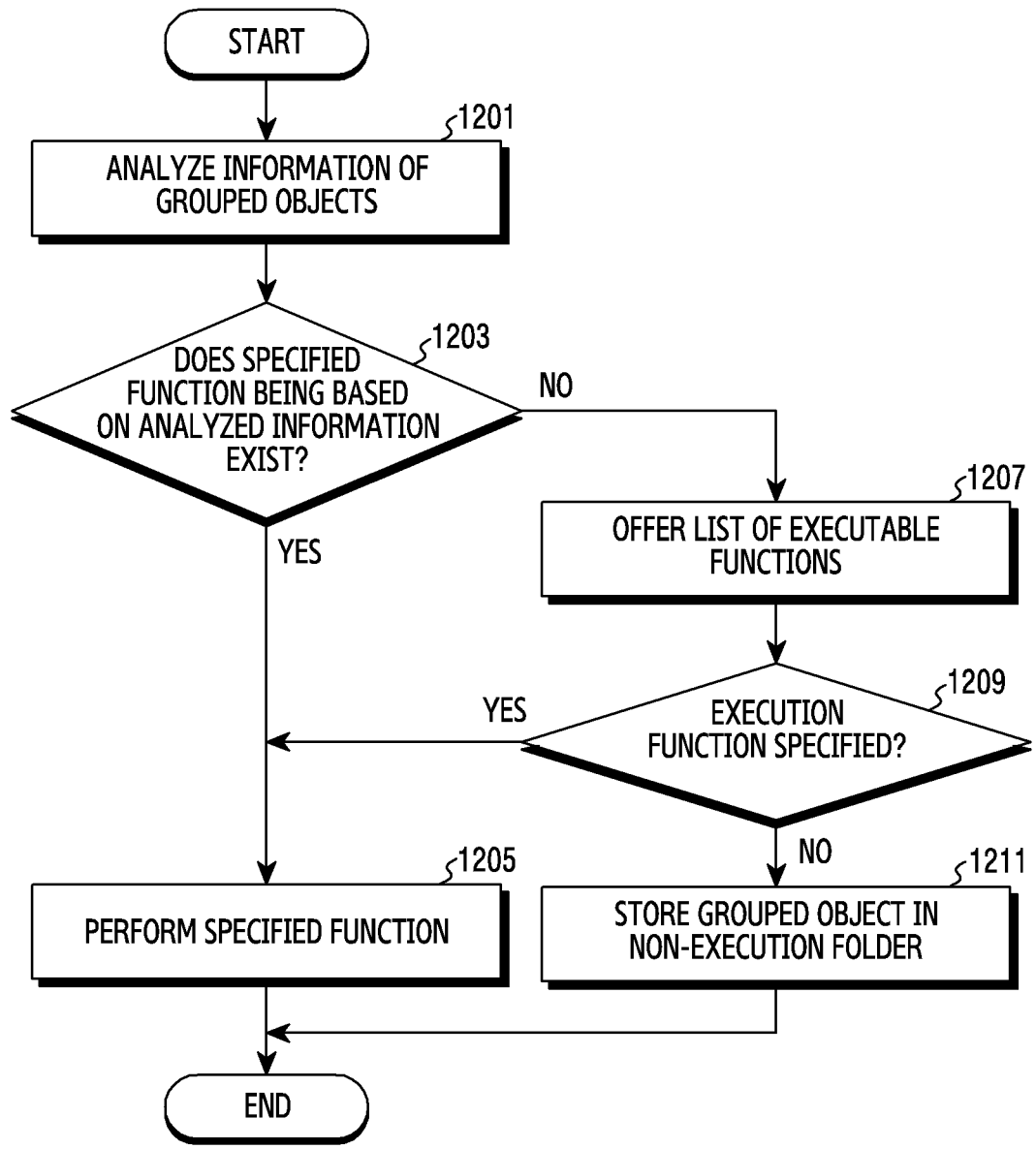
FIG. 12 is a flowchart for explaining an example of an operation of performing a function which is based on a grouped object.

FIG. 12 is a flowchart for explaining an example of an operation of performing a function which is based on a grouped object.

In operation 1201, a processor (e.g., the processor 210 of FIG. 2 or the processor 320 of FIG. 3) can analyze information of grouped objects. Accordingly to this, the processor 210 or 320 can extract common information or analogized information from the information of the grouped objects.

In operation 1203, the processor 210 or 320 can check whether a specified function which will be executed by the electronic device (e.g., the electronic device 100 of FIG. 1, the electronic device 200 of FIG. 2 or the electronic device 301 of FIG. 3) exists on the basis of the information of the grouped objects.

In response to the specified function existing, the processor 210 or 320 can, in operation 1205, perform the specified function instantly or by user selection. On the other hand, in response to a function corresponding to the common information or analogized information among the information of the grouped objects existing in the plural, the processor 210 or 320 can display and present the corresponding functions in sequence in order of function executed most for the corresponding objects or in order of function executed generally most or according to user setting order, thereby allowing a user to select. In response to only one function existing, the processor 210 or 320 can allow to perform the corresponding function instantly or according to user selection.

On the other hand, in response to it being determined that the specified function does not exist on the basis of the analyzed information, the processor 210 or 320 can, in operation 1207, display a list of many executable functions and allow the user to specify a function the user intends to execute. In operation 1209, the processor 210 or 320 can check whether the user specifies the function the user intends to execute among the presented functions and, in response to the execution function being specified, the processor 210 or 320 can return to operation 1205 and perform the specified function.

On the other hand, in response to the function executable for the grouped objects not existing or not being specified by the user, the processor 210 or 320 can, in operation 1211, provide a folder and store the corresponding grouped objects in the folder. Also, the processor 210 or 320 can display the corresponding folder as a non-executed folder or a suspended folder.

FIG. 13A to FIG. 13H are diagrams for explaining an example of picking and grouping a plurality of objects and performing a function which is based on the grouped objects in an electronic device according to various embodiments.

Figure 13A:
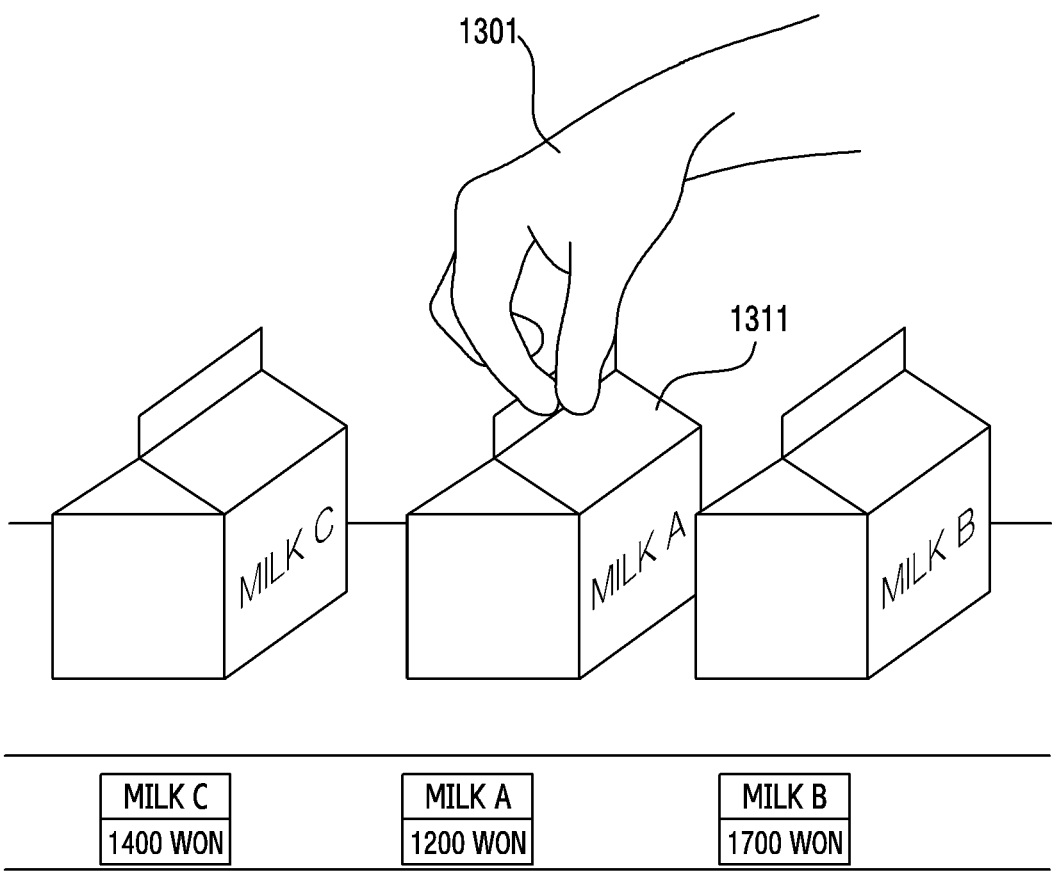
FIG. 13A to FIG. 13H are diagrams for explaining an example of picking and grouping a plurality of objects and performing a function which is based on the grouped objects in an electronic device according to various embodiments.

Referring to FIG. 13A, to pick a real object 1311 among a virtual object or real object presented through a display (e.g., the display 120 of FIG. 1 or the display device 360 of FIG. 3), a user can, for example, get a hand 1301 approach within a predetermined range of the real object 1311 and perform a pickup motion by using the thumb and the index finger, to execute a first input. The first input for the picking of the real object 1311, for example, can include a motion of drawing (checking), for example, in the form of the V for the object 1311 by using one or more fingers, and/or a motion of touching or tapping the object 1311 with a hand.

Figure 13B:
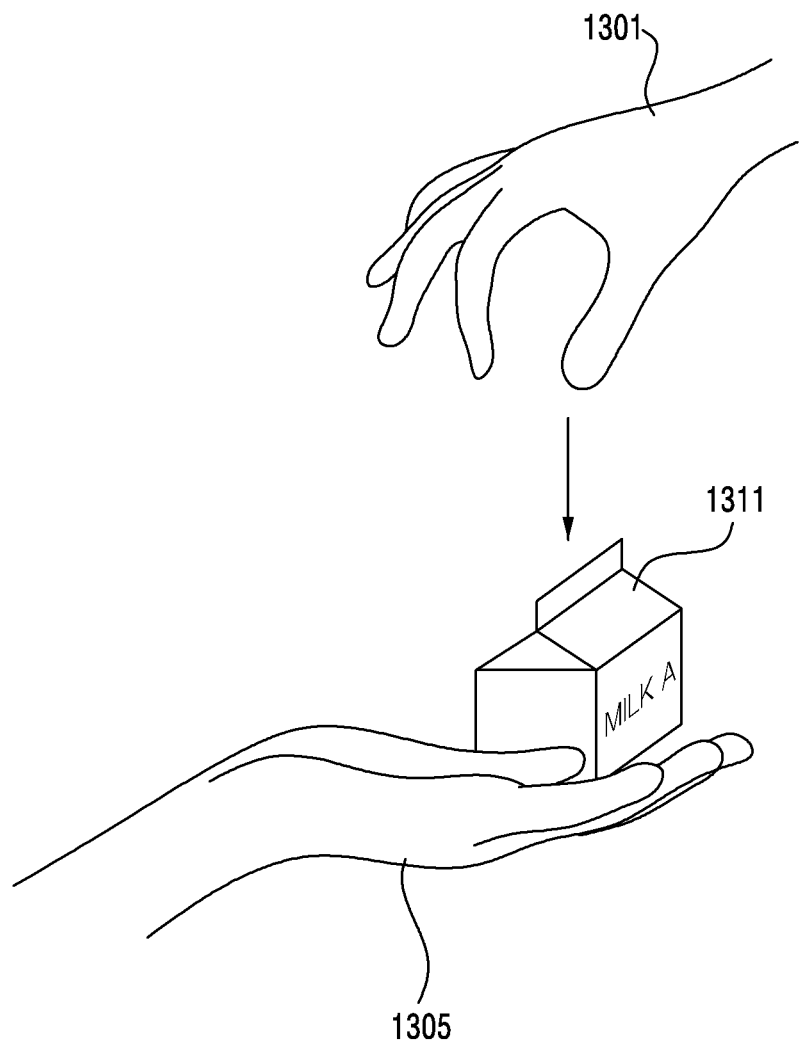

Referring to FIG. 13B, the user can perform a motion for a second input for associating the object 1311 and a specific region 1305 in a state of maintaining the first input for picking the object 1311. The second input for associating the object 1311 and the specific region 1305, for example, can include a series of input motions of moving the right hand 1301 and putting down the picked object 1311 within the specific region 1305 within a predetermined range from a palm specified by user's spreading out the palm of the left hand 1305, for example, within a region of the left hand 1305. The specific region, for example, can be visualized, and displayed, in a form and color such as a circle or oval and a tray or cart around the palm. The second input motion for associating the picked object 1311 and the region of the left hand 1305, for example, can include two or more motions of tapping, touching or checking the region of the left hand 1305 subsequent to a motion of tapping, touching or checking the corresponding object 1311.

Figure 13C:
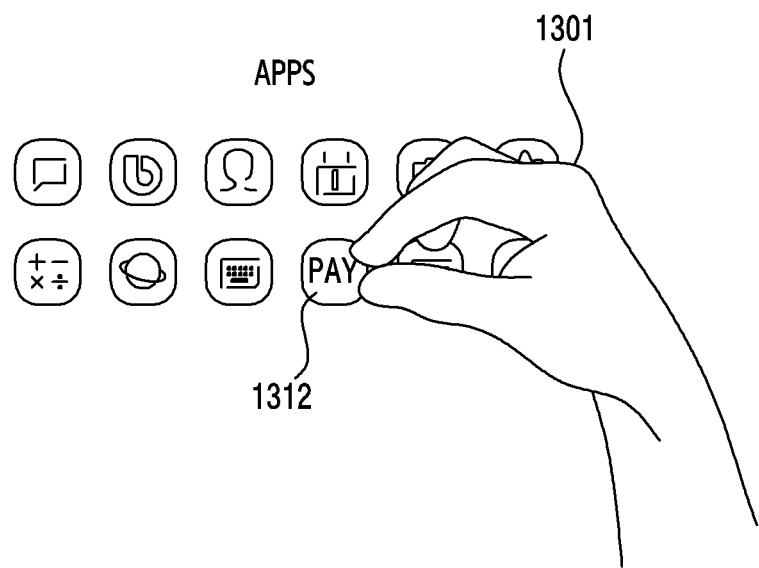
Figure 13D:
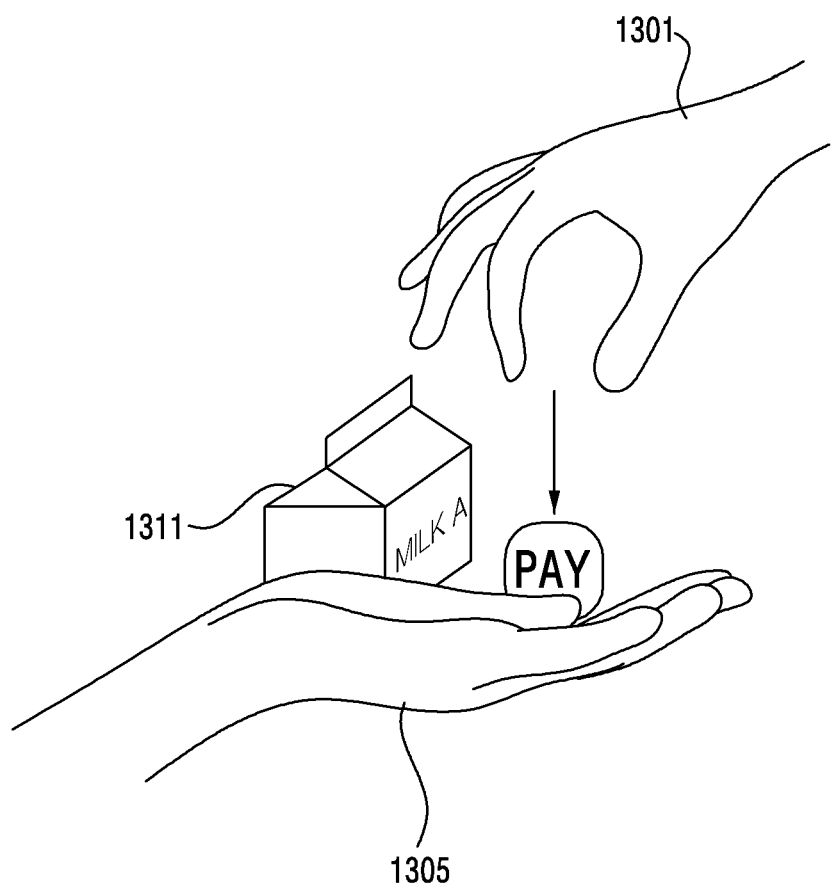
Figure 13E:
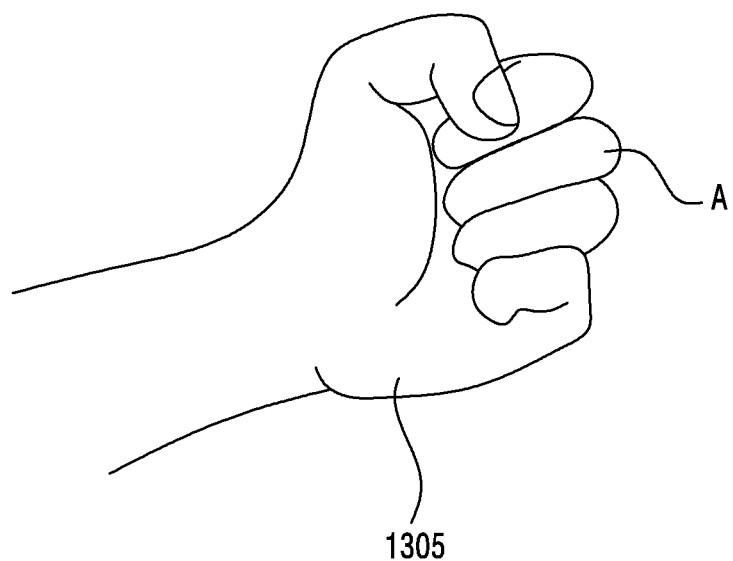

Referring subsequently to FIG. 13C, the user can maintain a state of spreading out the left hand 1305 and select an icon 1312 of an electronic payment app among many applications by using the right hand 1301 and move to the region of the left hand 1305 and put down within the region, thereby additionally selecting the electronic payment app 1312 as a grouping target. Milk 1311 being the real object and the electronic payment app 1312 being a virtual object can be selected and included in the region of the left hand 1305.

Referring to FIG. 3D and FIG. 3E, to group the picked objects 1311 and 1312 or complete the picking, for example, the user can perform a motion of cupping the left hand 1305 and grabbing a fist and perform a motion for a third input. The third input, for example, can include a motion of tapping the region of the left hand 1305 twice or more (e.g., double tap) or a motion of touching and holding for a predetermined time or longer (e.g., long press), in addition to a motion of grabbing the fist or cupping the palm.

The processor (e.g., the processor 210 of FIG. 2 or the processor 320 of FIG. 3) can confirm and analyze information about the specified objects. In response to the specified object being a virtual object, the processor 210 or 320 can confirm information about the virtual object. In response to being a real object, for example, the processor 210 or 320 can transmit an image of the real object to a server (e.g., the server 308 of FIG. 3) or an external electronic device (e.g., the electronic device 302 or 304 of FIG. 3) and receive information about the corresponding image.

The processor 210 or 320 can extract a list of functions corresponding to common information or analogized information among the information of the grouped objects 1311 and 1312. Through information analysis for the milk 1311 and the electronic payment app 1312, the processor 210 or 320, for example, can present a function for making electronic payment for, for example, milk 1311.

Figure 13F:
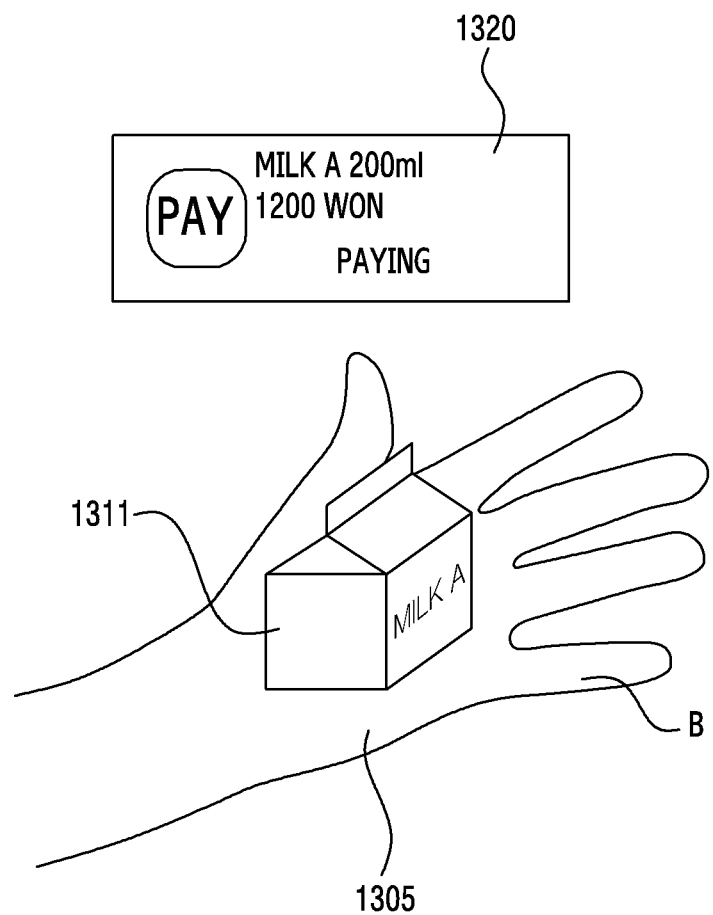

Referring to FIG. 13F, the user can perform, for example, a motion of spreading out the palm of the left hand 1305 as a fourth input for confirming (viewing) the grouped objects 1311 and 1312. Besides this, the fourth input, for example, can include a motion of tapping the region of the left hand 1305 at plural times (e.g., double tap) or a motion of touching and holding for a predetermined time or longer (e.g., long press) or uttering a confirming (viewing) command by a voice. Also, the fourth input, for example, can include a motion such as a gesture of attaching an object such as a tray or cart representing a specific region, to a specified region such as an edge of a bottom, wall or screen.

In response to receiving the fourth input, the processor 210 or 320 can display images, and/or information, of the grouped objects, or the electronic device 100, 200 or 301 can offer a specified function on the basis of the information of the grouped objects.

Referring to FIG. 13F, the processor 210 or 320 can offer a function 1320 of making electronic payment for milk which can be analogized through language completion from the information (milk and electronic payment) of the grouped objects.

Figure 13G:
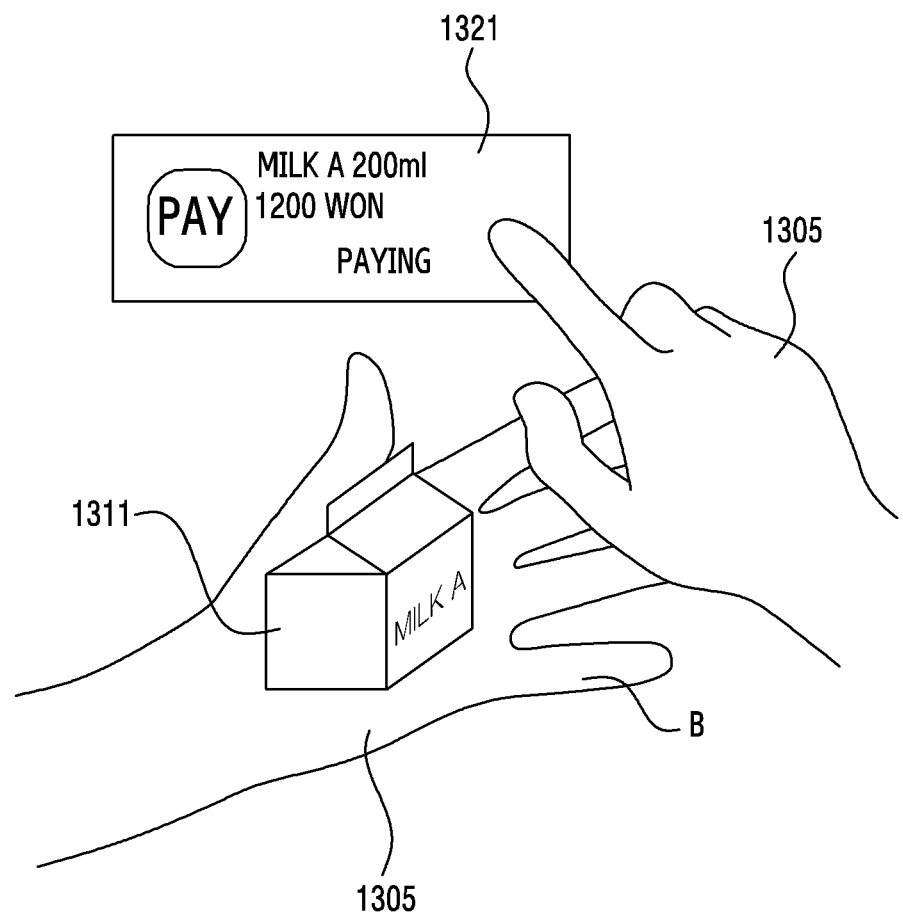

Referring to FIG. 13G, the processor 210 or 320 can display an object 1321 representing a function of making payment for milk and, for example, the user can select a milk payment function 1321 by using the hand 1305.

Figure 13H:

In response to user's selecting of the milk payment function 1321, referring to FIG. 13H, the processor 210 or 320 can execute the milk payment function and display (1322) the execution result.

FIG. 14A to FIG. 14D are diagrams for explaining another example of picking and grouping a plurality of objects and performing a function which is based on the grouped objects in an electronic device according to various embodiments.

Figure 14A:
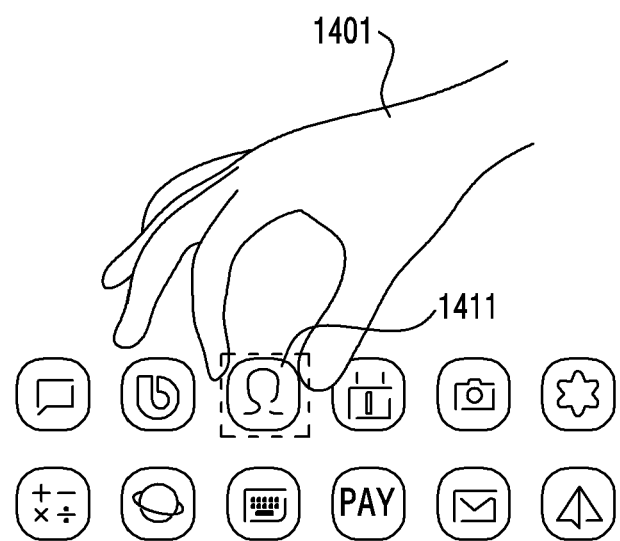
FIG. 14A to FIG. 14D are diagrams for explaining another example of picking and grouping a plurality of objects and performing a function which is based on the grouped objects in an electronic device according to various embodiments.
Figure 14B:
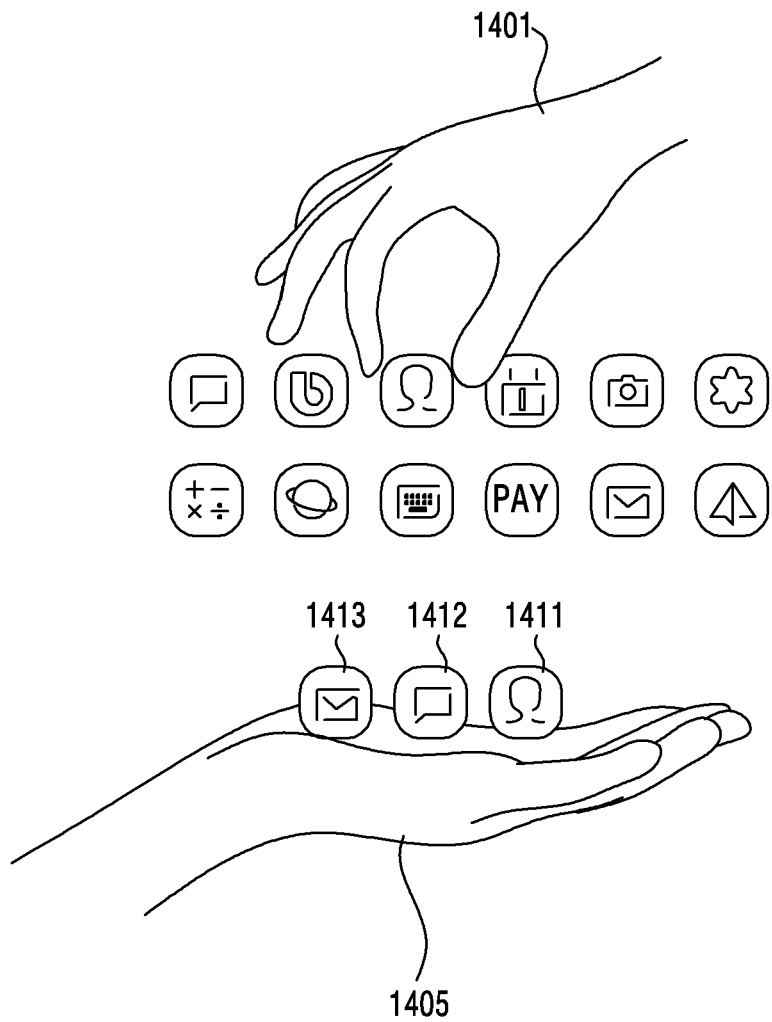

Referring to FIGS. 14A and 14B, a user can pick virtual objects including a plurality of app icons and hold in a region of a left hand 1405, by using a right hand 1401. The picked plurality of virtual objects 1411, 1412 and 1413 can be displayed in the region of the left hand 1405.

Figure 14C:
Figure 14C:
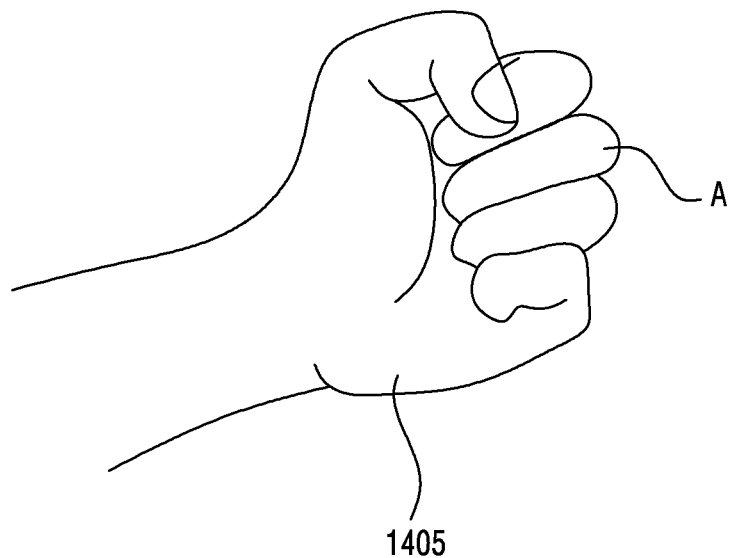
Figure 14D:
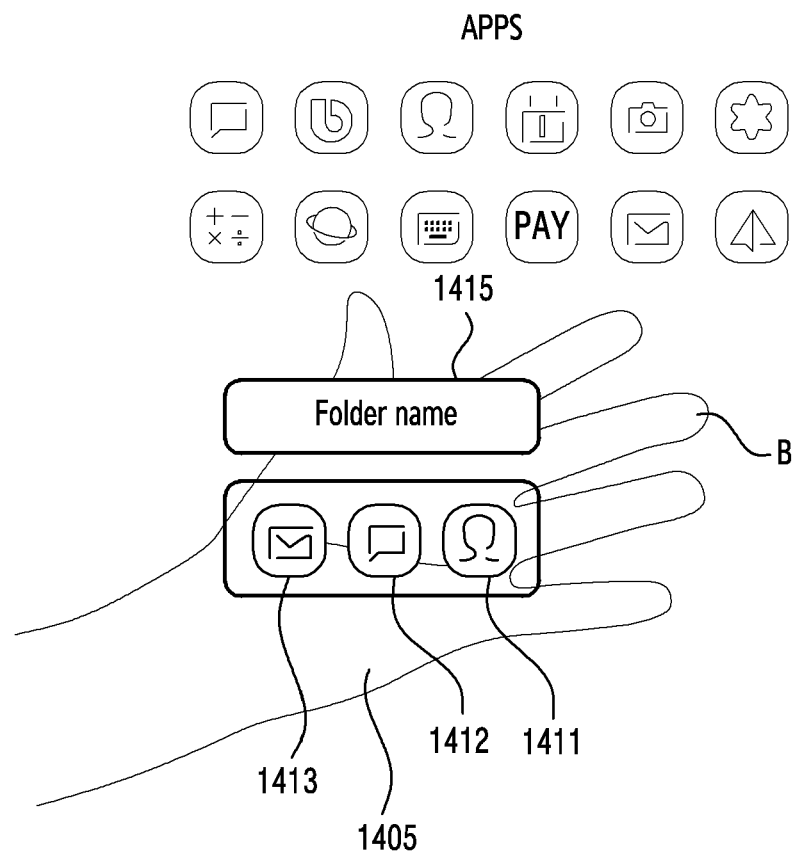

Referring to FIG. 14C, the user can complete the object pickup and perform grouping, through a motion of cupping the left hand 1405 and grabbing a fist. In this case, common information between the grouped objects is an app, and a function which can be presented may not exist according to the common information or analogized information. In this case, the processor 210 or 320 can provide a new folder 1415 and move and store the grouped apps 1411, 1412 and 1413 in the folder 1415. Also, the processor 210 or 320 can allow to specify a name of the provided folder, or mark and display as a temporary folder.

FIG. 15A to FIG. 15D are diagrams for explaining a further example of picking and grouping a plurality of objects and performing a function which is based on the grouped objects in an electronic device according to various embodiments.

Figure 15A:
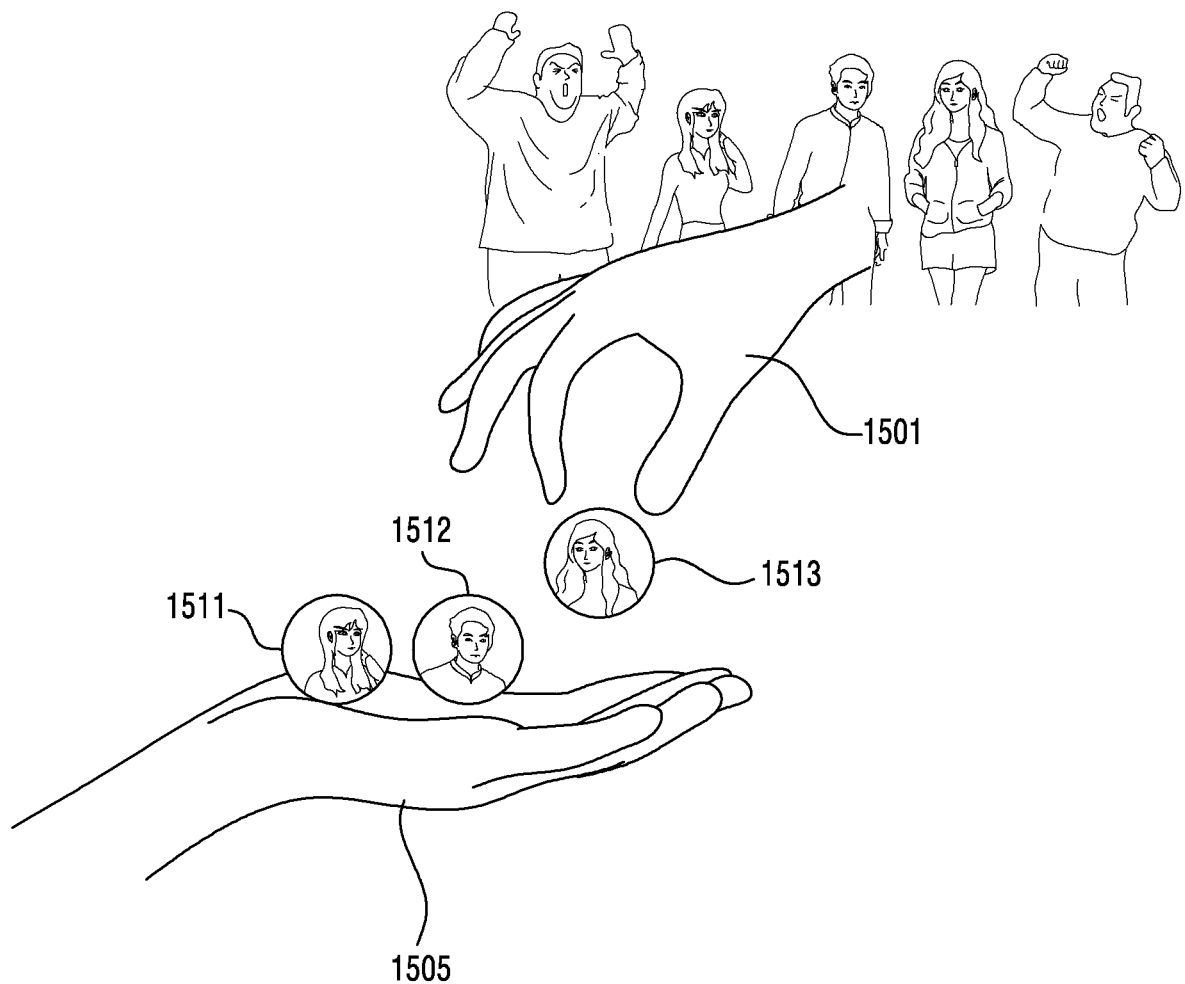
FIG. 15A to FIG. 15D are diagrams for explaining a further example of picking and grouping a plurality of objects and performing a function which is based on the grouped objects in an electronic device according to various embodiments.

Referring to FIG. 15A, a user can perform a motion for picking specific characters among many characters and holding in a region of a left hand 1505 by using a right hand 1501. Images 1511, 1512 and 1513 of the picked plurality of real objects can be displayed in the region of the left hand 1505.

Figure 15B:
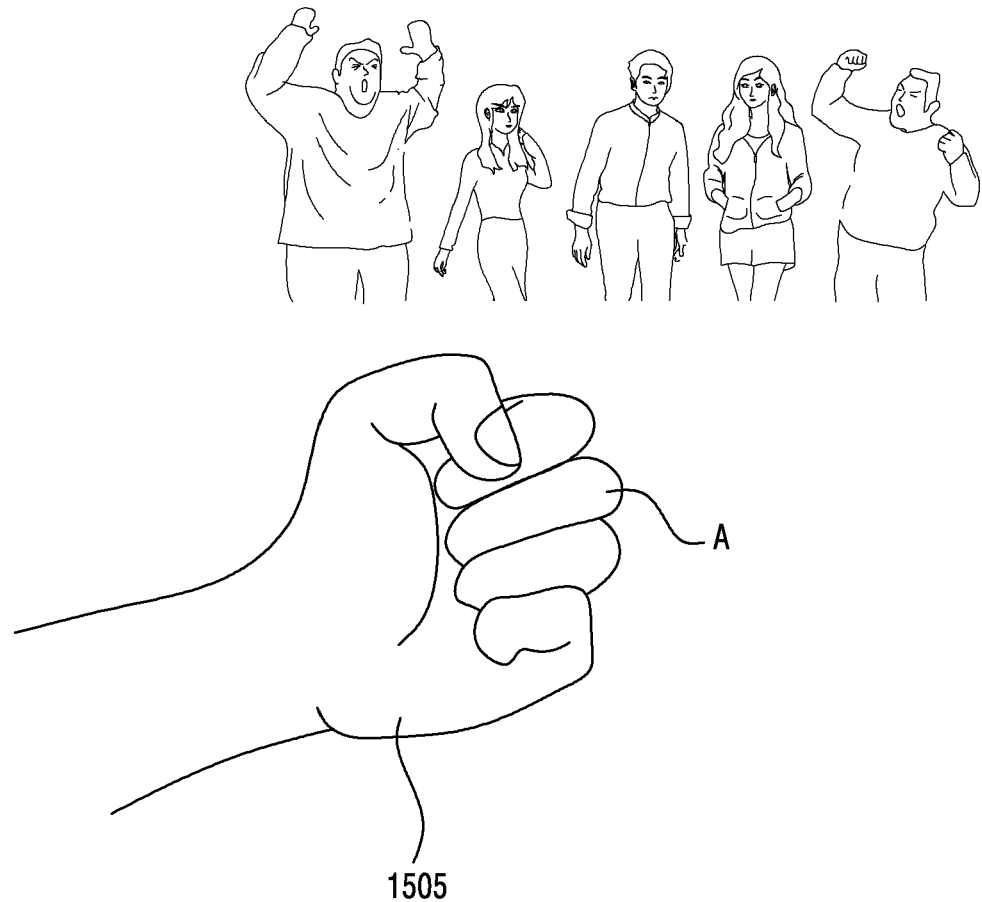
Figure 15C:
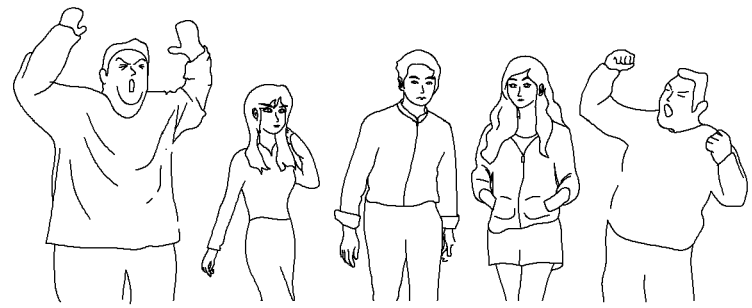
Figure 15C:
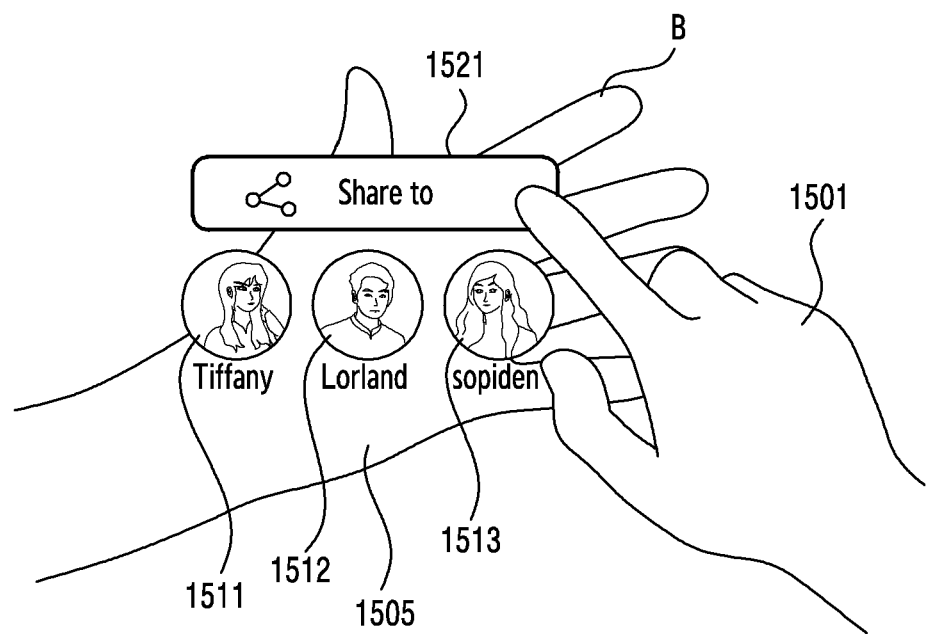
Figure 15D:
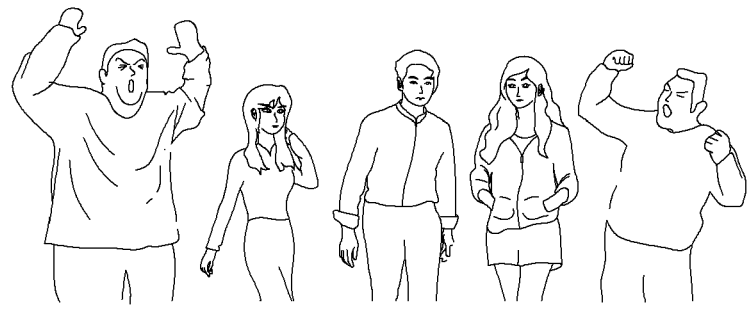
Figure 15D:
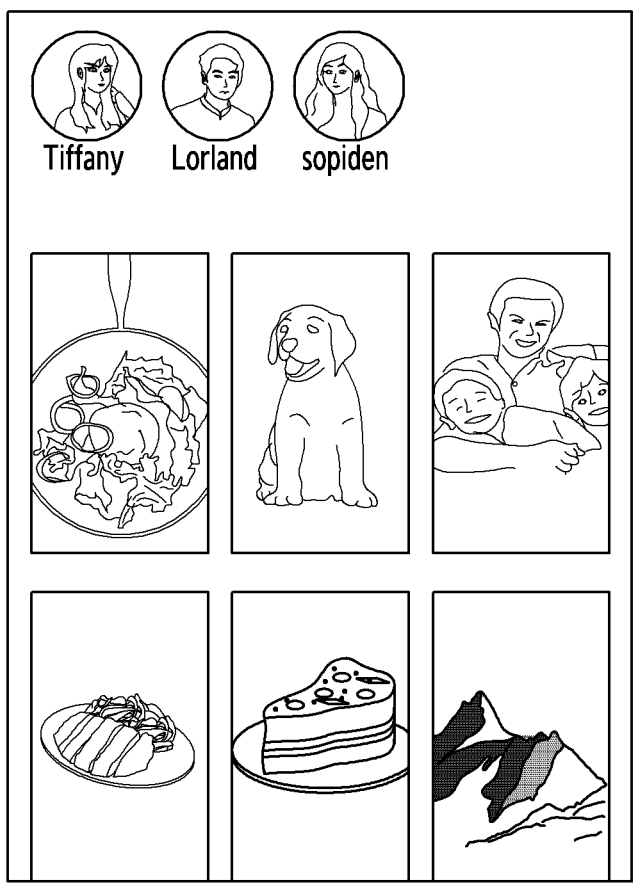

Referring to FIG. 15B, the user can complete the object pickup and perform grouping, through a motion (A) of cupping the left hand 1505 and grabbing a fist. In this case, common information between the grouped objects is a character, and a function which can be presented can be specified according to the common information or analogized information, or a function often used for the character can be presented. For example, in response to file share being specified or being often used for the character, referring to FIG. 15C, the processor 210 or 320 can recommend a file share app function 1521. In response to the user selecting the corresponding app 1521 by using the right hand 1501, the processor 210 or 320 can activate the characters 1511, 1512 and 1513 and the file share app, and list and display (1522) sharable files. In accordance with an embodiment, by an app targeting a character, a plurality of functions such as a video conference function and/or a collective talk function besides the file share app function can be extracted. In response to the plurality of functions being extracted, when there is not a previously specified function, for example, the functions can be presented to the user in order of function often used, to allow the user to select.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display;
a camera module; and
at least one processor,
wherein the at least one processor is configured to:
display objects through the display, wherein the objects include one or more real objects and one or more virtual objects;
receive a first input for picking any one object including a real object and a virtual object comprising an electronic payment application from the objects;
receive a second input for associating the picked object with a specific region;
receive a third input for grouping the objects picked by repeating the first input and the second input, wherein the third input is received corresponding to a motion of changing a palm of one hand of a user from a spread-out state and cupping the palm or grabbing a fist of the one hand of the user;
in response to the third input, extract information about the grouped objects, wherein the extracted information includes at least one of common information or analogized information; and
in response to a fourth input related to the grouped objects being received, execute a function which is corresponding to the extracted information about the grouped objects, wherein the function includes a first function for making the electronic payment for the real object of the grouped objects,
wherein the specific region is displayed in a form of a tray around the palm.

2. The electronic device of claim 1, wherein the second input is received in a state in which the first input is maintained.

3. The electronic device of claim 1, wherein the second input is received corresponding to a series of input motions.

4. The electronic device of claim 3, wherein the second input is received corresponding to motions which comprise a first motion of moving to the specific region in a state in which the first input is maintained and a second motion carried out for the any one object in the specific region.

5. The electronic device of claim 1, wherein at least one of the first to fourth inputs is received through the camera module.

6. The electronic device of claim 5, wherein the first input is received corresponding to a first motion of two or more fingers of the one hand of the user.

7. The electronic device of claim 6, wherein the second input is received corresponding to a motion of moving the one hand of the user to the region specified by a third motion of the other hand of the user, and a second motion of a finger of the one hand within the specific region.

8. The electronic device of claim 7, wherein the processor cancels the picking of a corresponding object correspondingly to the second motion of the finger of the one hand outside the specific region.

9. The electronic device of claim 7, wherein, in response to a fifth input which corresponds to a fourth motion of the other hand being received before receiving the fourth input, the processor cancels the picking of the grouped objects.

10. The electronic device of claim 7, wherein, in response to an editing mode being inputted after receiving the fourth input, the processor releases the grouping and sets wherein at least one of the grouped objects is pickable.

11. An operating method of an electronic device, the method comprising:
- displaying objects through a display of the electronic device, wherein the objects include one or more real objects and one or more virtual objects;
- receiving a first input for picking any one object including a real object and a virtual object comprising an electronic payment from the objects;
- receiving a second input for associating the picked object with a specific region;
- receiving a third input for grouping the objects picked by repeating the first input and the second input, wherein the third input is received corresponding to a motion of changing a palm of one hand of a user from a spread-out state and cupping the palm or grabbing a fist of the one hand of the user;
- in response to the third input, extracting information about the grouped objects and the electronic payment; and
- in response to a fourth input related to the grouped objects being received, execute a function which is corresponding to the extracted information about the grouped objects, wherein the function including a first function for making an electronic payment for the real object of the grouped objects,
- wherein the specific region is displayed in a form of a tray around the palm.

12. The method of claim 11, wherein the second input is received corresponding to motions which comprise a first motion of moving to the specific region in a state in which the first input is maintained and a second motion carried out for the any one object in the specific region.

13. The method of claim 11, wherein the second input is received corresponding to a first motion of two or more fingers of one hand of a user, and is received corresponding to a motion of moving the one hand of the user to the region specified by a third motion of the other hand of the user, and a second motion of a finger of the one hand within the specific region.

14. The method of claim 13, further comprising canceling the picking of a corresponding object correspondingly to the second motion of the finger of the one hand outside the specific region.

15. The method of claim 13, further comprising, in response to a fifth input which corresponds to a fourth motion of the other hand being received before receiving the fourth input, canceling the picking of the grouped objects.

16. The method of claim 15, wherein the first input is received corresponding to a first motion of two or more fingers of the one hand of the user.

17. The method of claim 11, wherein the second input is received in a state in which the first input is maintained.

18. The method of claim 11, wherein the second input is received corresponding to a series of input motions.

19. The method of claim 11, wherein at least one of the first to fourth inputs is received through a camera module.

20. The method of claim 19, wherein the first input is received corresponding to a first motion of two or more fingers of one hand of a user.

* * * * *